(12) United States Patent
Sarkissian et al.

(10) Patent No.: US 11,624,639 B2
(45) Date of Patent: Apr. 11, 2023

(54) ULTRASONIC FLOW METERING

(71) Applicant: Dune Labs Inc., Westlake Village, CA (US)

(72) Inventors: Garo S. Sarkissian, Thousand Oaks, CA (US); Gallin C. Chen, Thousand Oaks, CA (US); Bruce J. Buchan, Irvine, CA (US)

(73) Assignee: Dune Labs Inc., Westlake Village, CA (US)

( * ) Notice: Subject to any disclaimer, the term of this patent is extended or adjusted under 35 U.S.C. 154(b) by 155 days.

(21) Appl. No.: 16/844,333

(22) Filed: Apr. 9, 2020

(65) Prior Publication Data

US 2020/0326216 A1  Oct. 15, 2020

Related U.S. Application Data

(60) Provisional application No. 62/915,597, filed on Oct. 15, 2019, provisional application No. 62/831,399, filed on Apr. 9, 2019.

(51) Int. Cl.
*G01F 1/667* (2022.01)
*G06Q 50/06* (2012.01)
(Continued)

(52) U.S. Cl.
CPC .............. *G01F 1/667* (2013.01); *G01F 1/662* (2013.01); *G01F 25/10* (2022.01); *G01N 29/024* (2013.01);
(Continued)

(58) Field of Classification Search
CPC .. G01N 29/024; G01N 29/222; G01N 29/223; G01N 29/2437;
(Continued)

(56) References Cited

U.S. PATENT DOCUMENTS

| 5,533,408 A | 7/1996 | Oldenziel et al. |
| 5,546,813 A * | 8/1996 | Hastings ................. G01P 5/245 |
| | | 73/861.29 |

(Continued)

FOREIGN PATENT DOCUMENTS

| EP | 3953666 A1 | 2/2022 | |
| GB | 2343249 A * | 5/2000 | ............. G01F 1/002 |
| WO | 2020210475 A1 | 10/2020 | |

OTHER PUBLICATIONS

Srinivas Lingam, "Ultrasonic sensing technology for flow metering", webpage <https://www.ti.com/lit/wp/sway007/sway007.pdf?ts=1612825167579>, 7 pages, Sep. 2017, captured by Internet Archive Wayback Machine <https://web.archive.org/web/20180826234105/http://www.ti.com:80/lit/wp/sway007/sway007.pdf> on Aug. 26, 2018.

(Continued)

*Primary Examiner* — Benjamin R Schmitt
(74) *Attorney, Agent, or Firm* — KPPB LLP

(57) ABSTRACT

Embodiments include a novel, easy to install, non-intrusive, ultrasonic water flow meter with a self-calibrating three-piezoelectric transducer configuration attached externally to a water pipe, that allows for accurate measurement of water flow, and can provide the flow data to a remote system for billing and further analysis. The water flow data can further be analyzed for water consumption by individual fixtures, in support of conservation and usage management efforts.

32 Claims, 12 Drawing Sheets

(51) Int. Cl.
- *G01F 1/66* (2022.01)
- *G01N 29/24* (2006.01)
- *G01F 25/10* (2022.01)
- *G01N 29/024* (2006.01)
- *G01N 29/22* (2006.01)

(52) U.S. Cl.
CPC ......... *G01N 29/222* (2013.01); *G01N 29/223* (2013.01); *G01N 29/2437* (2013.01); *G06Q 50/06* (2013.01); *G01N 2291/02836* (2013.01); *G01N 2291/056* (2013.01); *G01N 2291/105* (2013.01)

(58) Field of Classification Search
CPC ... G01N 2291/02836; G01N 2291/056; G01N 2291/105; G01F 1/667; G01F 1/662; G01F 25/10
See application file for complete search history.

(56) References Cited

U.S. PATENT DOCUMENTS

| | | | |
|---|---|---|---|
| 6,158,288 | A | 12/2000 | Smith |
| 6,178,827 | B1 | 1/2001 | Feller |
| 2014/0305215 | A1 | 10/2014 | Debak et al. |
| 2014/0330127 | A1 | 11/2014 | Robert et al. |
| 2018/0156650 | A1 | 6/2018 | Nagareda et al. |
| 2018/0252563 | A1 | 9/2018 | Riedel et al. |
| 2019/0011300 | A1 | 1/2019 | Gloss et al. |
| 2019/0154480 | A1 | 5/2019 | Schöb et al. |

OTHER PUBLICATIONS

California Department of Food and Agriculture's (CDFA) Weights and Measures Field Reference Manual (2019).

Copper Tube Handbook. CDA Publication A4015-14/20 from the Copper Development Association, p. 64-66.

International Preliminary Report on Patentability for International Application PCT/US2020/027443, Report issued Sep. 28, 2021, dated Oct. 21, 2021, 9 Pgs.

International Search Report and Written Opinion for International Application No. PCT/US2020/027443, Search completed Aug. 6, 2020, dated Aug. 19, 2020, 10 Pgs.

"Liquid Measuring Devices 2019", and their National Type Evaluation Program (NTEP), NCWM Publication 14, 2019.

"NIST Handbook 44 2019" from the National Institute of Standards and Technology, National Conference on Weights and Measures (NCWM) 2018.

Lee et al., "An implementation of ultrasonic water meter using dToF measurement", Cogent Engineering, Aug. 2017, 4(1) DOI:10.1080/23311916.2017.1371577.

Mirshab, "Ultrasonic Sensing for Water Flow Meters and Heat Meters", TI Application Report SNIA020, Apr. 2015.

* cited by examiner

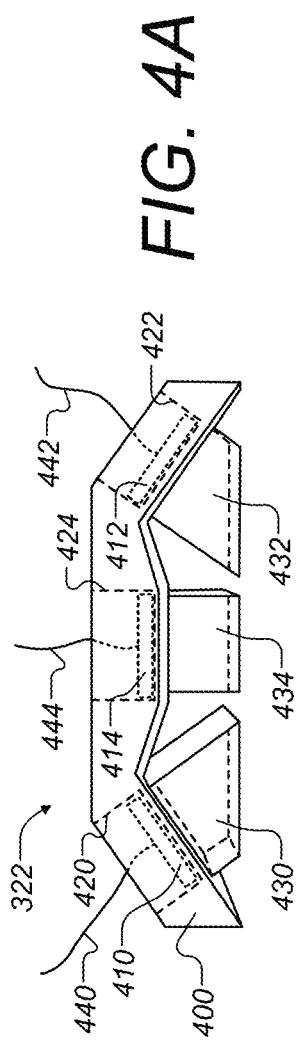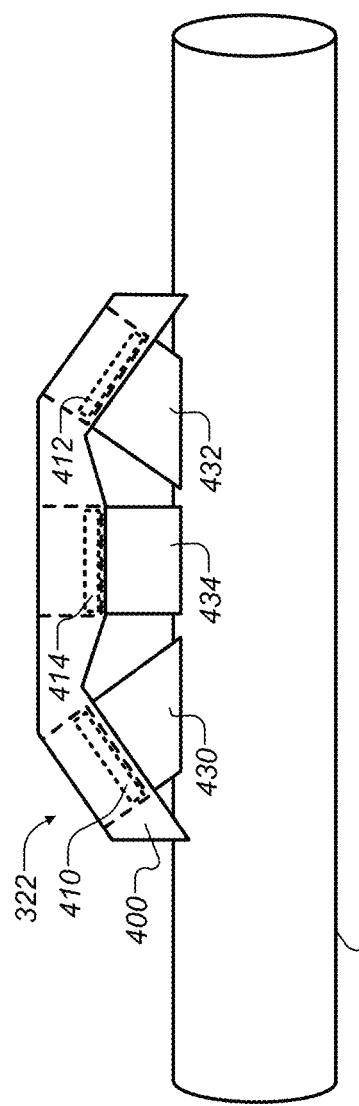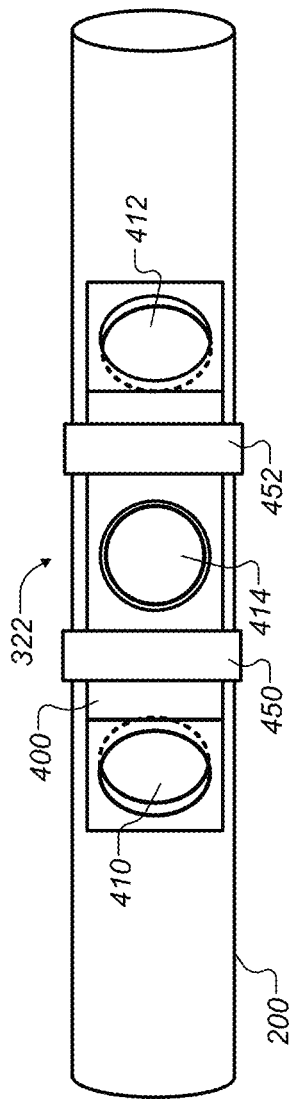

ULTRASONIC FLOW METERING

REFERENCE TO RELATED APPLICATIONS

This patent application claims the benefit of and incorporates by reference each of the following provisional applications:

U.S. Prov. Ser. No. 62/915,597 filed Oct. 15, 2019; and
U.S. Prov. Ser. No. 62/831,399 filed Apr. 9, 2019.

This patent application is related to and incorporates by reference the following International Patent Application filed on even date herewith: Int'l Pat. Appl. No. PCT/US20/27443.

All of the above-referenced patent applications are collectively referenced herein as "the commonly assigned incorporated applications."

FIELD

This patent specification generally relates to measuring flow rates of water. More particularly this specification relates to ultrasonic based water flow meters.

BACKGROUND

In many regions of the world, as populations outgrow the readily available sources of water, water for human consumption is becoming a scarce resource. Yet, much of the water, post treatment for human consumption, is wasted away due to inefficient or sub-optimal patterns of human consumption.

In order to promote water conservation, particularly at times of droughts, some cities, utilities and other agencies have instituted conservation programs for both residential and commercial consumers that include incentives, education as well as financial penalties at elevated consumption levels. However, these same water consumers are often given limited access to data and insights on their actual water consumption patterns. Further, any data that is provided is usually not granular enough to guide consumers on how best to manage their water consumption, which compounds the problem. In reality, any access to data provided by the utilities is often not timely, as it is typically provided through the billing cycle process and is delayed by weeks from the actual consumption dates.

A different set of challenges are faced by commercial and business consumers, such as those in multi-tenant residences, mixed use commercial/residential properties, hotels and office parks, among others, where the water utility typically provides a master meter for an entire site with no sub-metering at the unit level. In such cases, consumers of water have no visibility into their actual water consumption levels and little incentive to reduce consumption as they do not bear the short term direct costs of their own water consumption. While sub-metering by the utilities in certain cases could resolve these perverse consumption dynamics that exist at master metered sites, it is typically quite disruptive requiring major replumbing, and is often prohibitively expensive to do so for the property owners.

There have been efforts and innovations in the water and consumer electronics industries to tackle some of the challenges identified above. Specifically, innovative solutions can be found in the commercial marketplace that tackle indoor home water leak detection, and in certain cases even indoor home water flow rate measurements that can be displayed in near real time through a smart phone application. Yet none of these solutions have been widely adopted by consumers due to inherent fundamental technical and practical limitations that severely curtail their applicable use cases. Limitations of known solutions can include one or more of the following: (1) inability to capture data on outdoor water usage for landscaping and pools; (2) inability to detect outdoor water leaks such as broken sprinkler heads; (3) reliance on intrusive and expensive professional "in-line" installations; (4) reliance for access to the home/site's local wireless network which often is not robust enough to maintain persistent and continual connectivity for the life of the product that could be upwards of 10 years; (5) reliance on close proximity to an electrical outlet to power the product; (6) need to install multiple products at each water consumption or potential leak point/faucet across a home/site; (7) need to install multiple water meters for an apartment if the water lines are shared, such as coming from a shared water heater and (8) need to replumb in order to do sub-metering if the water pipes serving an apartment are not dedicated and continue onto other apartments, such that a meters reading may be indicative of water use in multiple apartment units.

States and municipalities are also taking some legislative action to drive conservation efforts, such as Senate Bill No. 7 (SB 7) in California, where there is now a requirement that new multi-family construction must have unit level sub-metering, which is resulting in at least one water meter being installed per apartment, and potentially more than one if hot water comes from a water heater shared amongst units, or water pipes serving an apartment continue on to serve additional units.

Water meters typically have to comply with national and/or state level requirements such as those in: 1) "*NIST Handbook* 44 2019" from the National Institute of Standards and Technology, which is adopted by the National Conference on Weights and Measures (NCWM), 2) "*NCWM Publication* 14. *Liquid Measuring Devices* 2019", and their National Type Evaluation Program (NTEP), and 3) the California Department of Food and Agriculture's (CDFA) "Weights and Measures *Field Reference Manual* (2019)", which contains extracts from the California Code of Regulations Title 4 Division 9. All of the foregoing are incorporated herein by reference. The governmental requirements include, but are not limited to: measurement accuracy of water consumption levels; repeatability of measurements; ability to audit the measurement results; and requirements around tamper proofing of meters. Residential water meters that comply with governmental requirements are commercially available. Some meters are also certified for water sub-metering applications, as can be seen in the CDFA's California Type Evaluation Program's approval database. Regardless of the underlying technology utilized, most or all of known water meters that comply with the regulatory requirements are of the in-line variety. In-line meters require that the water pipe be cut and the meter installed in-line with the water pipe such that the water flows through a piece of pipe that is attached to and is an integral part of the water meter. The advantage of an in-line water meter is that the manufacturer of the meter can adequately control all the critical dimensions required to accurately measure the volume of liquid flowing through a pipe. Significant disadvantages of in-line water meters are the cost and effort involved in deploying them in existing master metered multi-family apartments, often requiring apartments to be re-plumbed to retrofit an existing master metered property with one sub-meter per apartment.

SUMMARY

According to some embodiments, an ultrasonic flow meter is described that is configured to be externally mounted on a pipe through which a medium (e.g. water) flows. The meter includes first and second ultrasonic transducers. When the meter is externally mounted on the pipe, the first and second transducers are configured to alternately transmit or sense ultrasonic acoustic waves propagating primarily at oblique angles relative to the direction of flow of the medium through the pipe. The meter also includes a third ultrasonic transducer that is configured to transmit or sense ultrasonic acoustic waves propagating primarily at a right angle relative to the direction of flow of the medium through the pipe. The meter also includes a processing system configured to calculate a flow rate for the medium flowing through the pipe based on time of flight measurements made between the first and second ultrasonic transducers. According to some embodiments, the flow rate calculation has reduced or eliminated dependence on temperature of the medium, based at least in part on the time of flight measurements made by the third transducer.

According to some embodiments, the reduction or elimination of temperature dependence is based at least in part on a determination of an inner (or outer) diameter of the pipe based on the time of flight measurements made by the third transducer. According to some embodiments, the time of flight measurements made by the third transducer are made when the medium is present but not flowing through the pipe. According to some embodiments the time of flight measurements made by the third transducer are used to calculate a cross-sectional area of the pipe which is in turn used for the flow rate calculations.

According to some embodiments, the first, second and third ultrasonic transducers are piezoelectric transceivers.

According to some embodiments, the processing system is further configured to perform self-calibration procedures, such as compensating for mismatches in time-of-flight measured for ultrasound waves propagating in upstream and downstream directions at times when the medium in the pipe is not flowing.

According to some embodiments, one or more temperature sensors are configured to be coupled to the water pipe, and the reduced or eliminated dependence on temperature of the medium is based in part on known time of flight (ToF) variations due to temperature variations.

According to some embodiments, the processing system is further configured to detect a presence or absence of ultrasonic acoustic waves travelling along an exterior surface of the pipe. The sensing of surface waves can be used to detect when the meter is not mounted on a pipe which can be used to detect tampering and/or to conserve power. The sensing of the surface waves can also be used in the self-calibration process to generate calibration factors used in calculating the distance an ultrasonic acoustic wave travels in the water medium.

According to some embodiments, a remote display device can be configured to display information from the flow meter. According to some embodiments, the remote display device is part of a multi-purpose mobile computing device, such as a smartphone or tablet device.

According to some embodiments, a carrier assembly is provided upon which the first, second and third ultrasonic transducers are mounted. The carrier is configured to be externally mounted (e.g. clamped) on the pipe such that the first, second and third ultrasonic transducers are in a fixed position with respect to and can send and receive ultrasonic wave to and from the external surface of the pipe, and suitable for a range of pipe sizes, wall gauges, and different materials.

According to some embodiments, a method for measuring of a medium flowing through a pipe is described. The method includes: measuring time of flight of ultrasonic pulses propagating between first and second ultrasonic transducers being mounted externally on the pipe. The ultrasonic pulses propagate through a wall of the pipe a first time, through the medium flowing in the pipe at an oblique angle with respect to a direction of flow of the medium though the pipe, and propagating through the wall of the pipe a second time. The method also includes measuring time of flight of ultrasonic pulses from a third ultrasonic transducer. The ultrasonic pulses from the third transducer propagate at substantially a right angle with respect to a direction of flow of the medium though the pipe. The method also includes calculating the flow rate for and/or volume of the medium flowing through the pipe based on the time of flight measurements made between the first and second ultrasonic transducers. The flow rate calculation has reduced or eliminated dependence on temperature of the medium, based at least in part on the time of flight measurements made by the third transducer.

According to some embodiments, an easily installed external, non-intrusive, water flow meter is described. The flow meter can have a level of accuracy and repeatability, as well as auditability and tamper proofing, that complies with regulatory requirements and may be certified by regulatory bodies and agencies for water sub-metering use.

As used herein the terms "flow meter" and "flow meters" include meters configured to measure use and/or volume of a medium flowing through a pipe such as a water meter.

As used herein, the grammatical conjunctions "and", "or" and "and/or" are all intended to indicate that one or more of the cases, object or subjects they connect may occur or be present. In this way, as used herein the term "or" in all cases indicates an "inclusive or" meaning rather than an "exclusive or" meaning.

BRIEF DESCRIPTION OF THE DRAWINGS

To further clarify the above and other advantages and features of the subject matter of this patent specification, specific examples of embodiments thereof are illustrated in the appended drawings. It should be appreciated that elements or components illustrated in one figure can be used in place of comparable or similar elements or components illustrated in another, and that these drawings depict only illustrative embodiments and are therefore not to be considered limiting of the scope of this patent specification or the appended claims. The subject matter hereof will be described and explained with additional specificity and detail through the use of the accompanying drawings in which:

FIGS. 4A-4C are diagrams illustrating a three-piezoelectric transducer assembly for use in a connected external flow meter for measuring water flow, according to some embodiments;

DETAILED DESCRIPTION

Figure 1A:
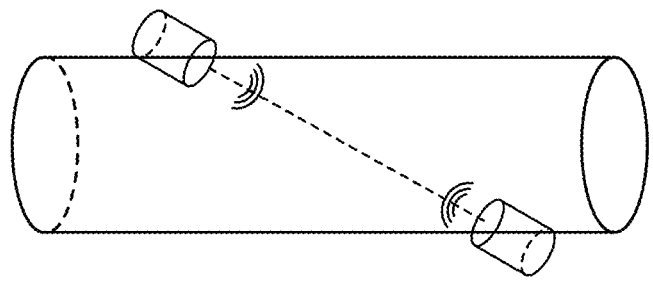
FIGS. 1A-1D are diagrams illustrating various configurations of in-line placement of transducer pairs for intrusive ultrasonic flow meters.
Figure 1B:
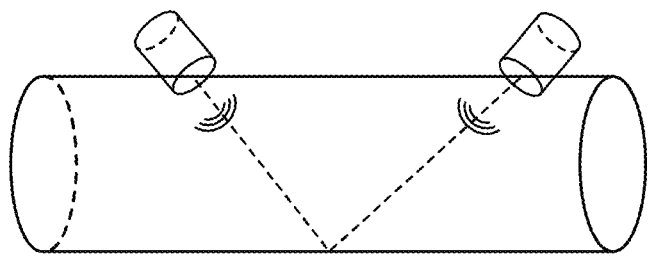
Figure 1C:
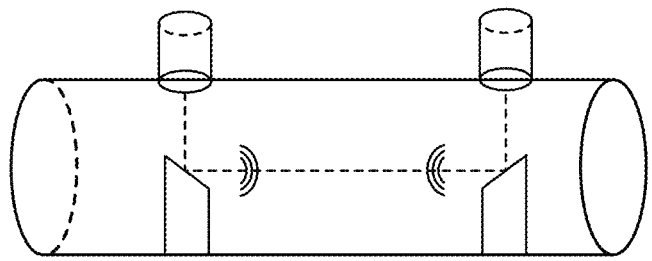
Figure 1D:
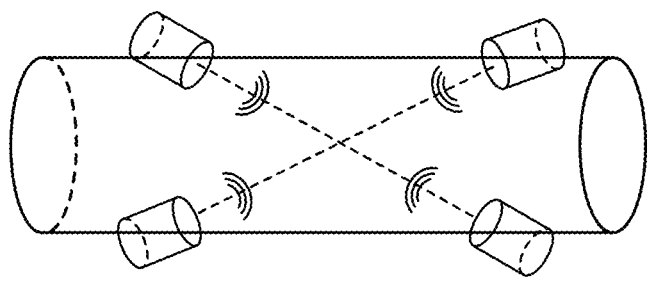

A detailed description of examples of preferred embodiments is provided below. While several embodiments are described, it should be understood that the new subject matter described in this patent specification is not limited to any one embodiment or combination of embodiments described herein, but instead encompasses numerous alternatives, modifications, and equivalents. In addition, while numerous specific details are set forth in the following description in order to provide a thorough understanding, some embodiments can be practiced without some or all of these details. Moreover, for the purpose of clarity, certain technical material that is known in the related art has not been described in detail in order to avoid unnecessarily obscuring the new subject matter described herein. It should be clear that individual features of one or several of the specific embodiments described herein can be used in combination with features of other described embodiments or with other features. Further, like reference numbers and designations in the various drawings indicate like elements.

According to some embodiments, an external, non-intrusive, ultrasonic water flow meter is described that is configured to consistently measure flow rates for residential and commercial water metering and sub-metering. According to some embodiments, the described flow meter is a clamp-on, non-intrusive meter. The metering system can operate with relatively high accuracy while overcoming challenges associated with clamp-on, non-intrusive meters including one or more of the following: (i) estimating or determining the pipe's inner diameter; (ii) accounting for the temperature of the water that is flowing through the pipe; (iii) accounting for signal attenuation when signals possibly pass through multiple materials of varying sound transmission characteristics (e.g. by creating a design with a link budget for the transmission and receipt of signals passing from the outside of a pipe, through the water and then exiting the pipe, that has enough power efficiency to allow for robust multi-year operation on a battery without the need to recharge); (iv) accounting for multiple signal reflections that occur when signals pass from the outside of the pipe and reach the interface of various dissimilar materials, such as copper pipe and water; and (v) accounting for a range of possible pipe diameter sizes, thickness gauges, and pipe materials. According to some embodiments, an ultrasonic water meter is used that works on the principle of measuring time-of-flight of ultrasonic waves through the water medium in a pipe and detecting changes to the time-of-flight or to the phase of the ultrasonic waves as the water flow rate in the pipe changes. The theory and principles of operation of ultrasonic water flow metering are known. For example, see: "*Ultrasonic Sensing Technology for Flow Metering*" by Srinvas Lingam, Using Ultrasonic Technology for Flow Measurement, September 2017, the disclosure of which, including the disclosure related to systems and methods for measuring flow, is incorporated by reference herein in its entirety. FIGS. 1A-1D are diagrams illustrating various configurations of in-line placement of transceiver pairs for known intrusive ultrasonic flow meters, as discussed in the foregoing article.

Figure 2:
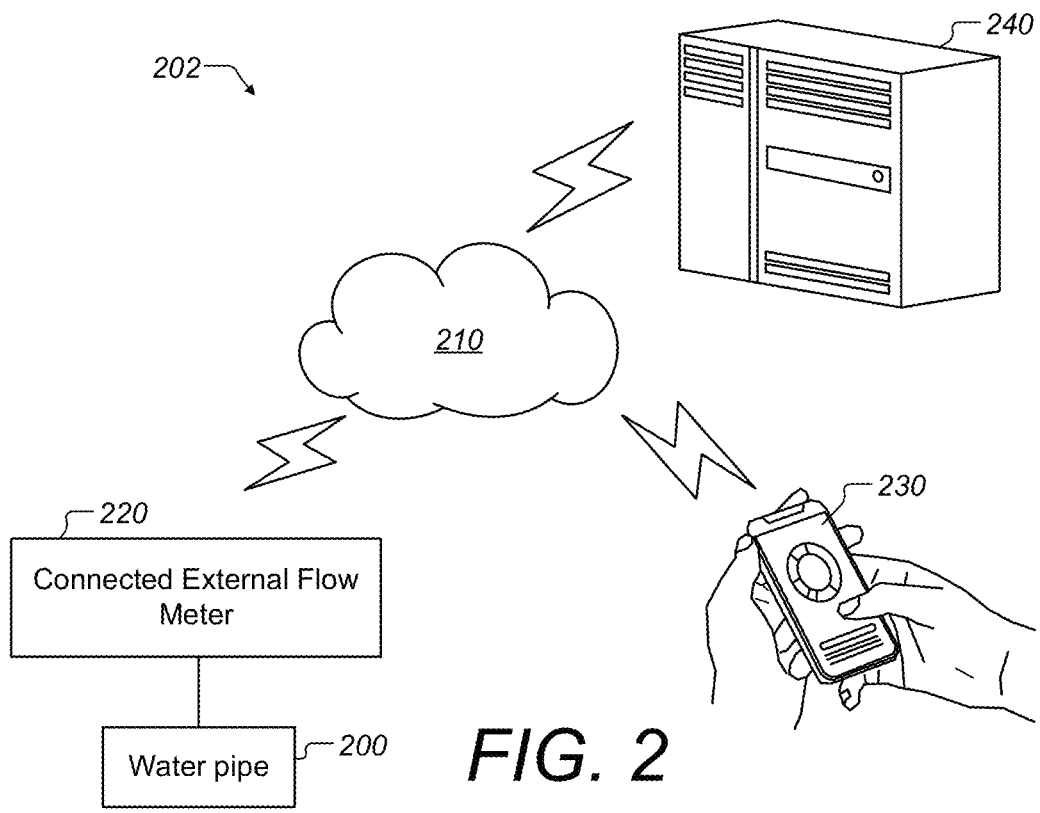
FIG. 2 is a conceptual diagram illustrating systems and methods for monitoring, managing and optimizing water consumption in homes, multi-tenant and/or commercial buildings and/or facilities, according to some embodiments.

FIG. 2 is a conceptual diagram illustrating a connected metering system for monitoring, managing and optimizing water consumption in homes, multi-tenant and/or commercial buildings and/or facilities, according to some embodiments. Connected metering system 202 includes a connected external flow meter 220 that measures water flowing through water pipe 200. The external flow meter(s) can be used with products and with computer programs to provide simple and cost effective solutions for monitoring, managing and optimizing water consumption for an entire home (indoors and outdoors), as well as a multi-tenant and/or commercial building/facility (entire site and sub units such as each apartment or office or room). According to some embodiments, connected metering system 202 can include: connected external flow meter 220, a user interface 230 and a backend or remote server 240, all connected to one another via a network 210.

Other configurations are possible including different combinations of the recited features and elements shown in any of the Figures. The system described in a particular Figure could be used in systems including those described in other specific Figures. For example, the connected external flow meter 220 shown in FIG. 3 could be utilized in the connected metering system 202 of FIG. 2.

Figure 3:
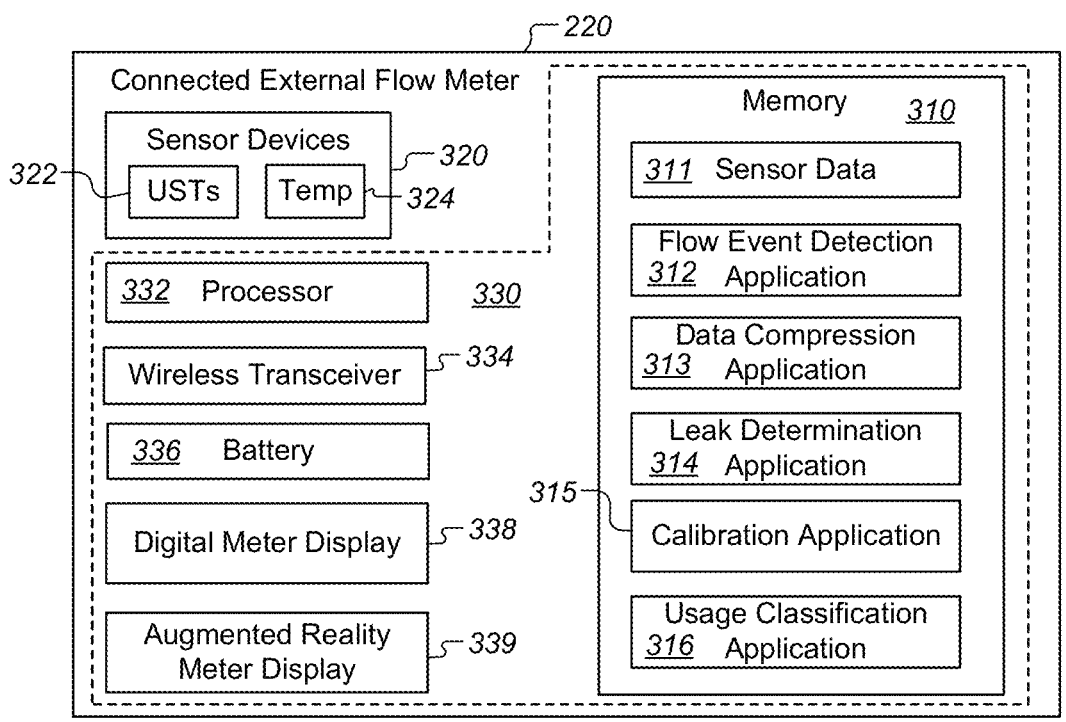
FIG. 3 is a conceptual block diagram illustrating further details of a connected external flow meter for measuring water flow, according to some embodiments.

FIG. 3 is a conceptual block diagram illustrating further details of a connected external flow meter for measuring water flow, according to some embodiments. Connected external flow meter 220 is installed at the target home, apartment or site. According to some embodiments, the meter 220 is configured to be: (i) easily installed by an able bodied person with no plumbing expertise; (ii) is self-sufficient with no requirement for (a) an external electrical power source or (b) a local network connection for data transport; and (iii) is able to accurately measure/sense data sufficient to calculate water flow and consumption levels through the water pipe it is installed on. The connected external flow meter 220 can include: sensor devices 320; processor(s); a wireless transceiver; a digital meter display; a QR code based display; an augmented reality meter display and a memory 310. Memory 310 can store sensor data as well as various applications such as: flow event detection application(s); data compression application(s); leak determination application(s); calibration application(s);

and usage classification application(s). According to some embodiments, a subset of the components shown in the example of FIG. 3 may be included in flow meter 220. In some embodiments, sensor devices 320 might include the ultrasonic transducers 322 and omit the temperature sensors 324. The electronic circuit assembly 330 might include processor 332, wireless transceiver 334, and memory 310 but omit battery 336, digital meter display 338 and augmented reality meter display 339. The Memory 310 might include sensor data 311 and calibration application 315 but omit flow event detection application 312, data compression application 313, leak determination application 314 and usage classification application 316. According to some other embodiments, the flow meter 220 might additionally include the temperature sensor(s) 324, the assembly 330 might additionally include battery 336, and the memory 310 might additionally include flow event detection application 312 and leak determination application 314.

According to some embodiments, connected external flow meter 220 can be configured to attach externally onto the water pipe at various locations such as in the vicinity of the water meter on the home/site side, or other location upstream from pipes being divided for outdoor vs. indoor use in cases where outdoor water usage is to be monitored; or on pipes entering each apartment. The connected external flow meter 220 is configured to be compact in size to require a relatively small amount of exposed water pipe length for installation. Connected external flow meter 220 can also be configured to be installed on water pipes that have been subdivided into the pipes for use by each apartment or office, including installation inside drywalls or in outdoor areas exposed to weather or subterranean enclosures, and in some cases separate meters 220 can be installed such as where several pipes (e.g. separate hot and cold water pipes) enter each apartment or other configurations.

According to some embodiments, the connected external flow meter 220 includes two or more ultrasonic transducers 322, each tightly coupled externally to the water pipe and of a quality and type suitable for water metering applications. According to some embodiments, each ultrasonic transducer has a disc shape with a diameter between 5 mm and 20 mm. Each ultrasonic transducer can be configured to generate and receive a sequence of precisely timed and choreographed directional ultrasonic pulses through the water inside the water pipe and utilize a delta time-of-flight methodology or other suitable technique for ultrasonic water flow measurement.

According to some embodiments, the connected external flow meter 220 is configured to be installed by a person with no plumbing expertise, such as a home-owner or property manager, or handyman, and the installation is not intrusive in that it does not require any replumbing, pipe-cutting or positioning "in-line" with the water pipe.

According to some embodiments, the connected external flow meter 220 is configured to capture data sufficient for the system to automatically self-determine the diameter. In particular, the system can self-determine an accurate value for the inner diameter of the pipe it is installed on. According to some embodiments, this may be achieved by taking measurements of the time-of-flight of ultrasonic pulses from a third transducer that are reflected back to itself (e.g. see transducer 414 shown in FIGS. 4A-4C, 5 and 10). This third transducer is tightly coupled externally and oriented orthogonally to the pipe. The different reflections measured by the third, orthogonally oriented transducer include: (1) transducer to and from the pipe wall/water near side interface; and (2) to and from the water/pipe wall far side interface. The difference between the two time-of-flight measurements is proportional to the inner pipe diameter. According to some embodiments, the derivation of the inner diameter of the pipe can be improved by taking the measurements when specific conditions of no water flow over a specified minimum amount of time occurs. According to some embodiments, the ultrasonic transducers are externally coupled to a water pipe and generate, transmit and receive directional ultrasonic pulses through the water inside the pipe at a frequency of between 0.25 MHz to 10 MHz. According to some embodiments, the frequency range can be between 0.5 MHz to 5 MHz. According to yet some embodiments, the frequency range can be between about 1 MHz to about 2 MHz. According to some embodiments, the medium being measured is not water but another liquid or gas flowing through the pipe. The acoustic frequency range should be consistent with the medium being measured. For example, a frequency range of 160 KHz to 600 KHz may be used when flow meter 220 is configured to measure certain types of gas(es).

According to some embodiments, the flow meter 220 also includes one or more temperature sensors 324 configured to measure and to capture the water pipe temperature and/or the ambient temperature in the immediate vicinity of the water pipe. The data can be provided, on an ongoing, periodic, or with each water flow event basis, to temperature compensation circuitry and algorithms, for example in an electronic circuit assembly 330. The data can be used for temperature compensation calibration adjustment, and/or to determine if the flow meter 220 is connected to a cold water pipe or a hot water pipe.

Figure 13:
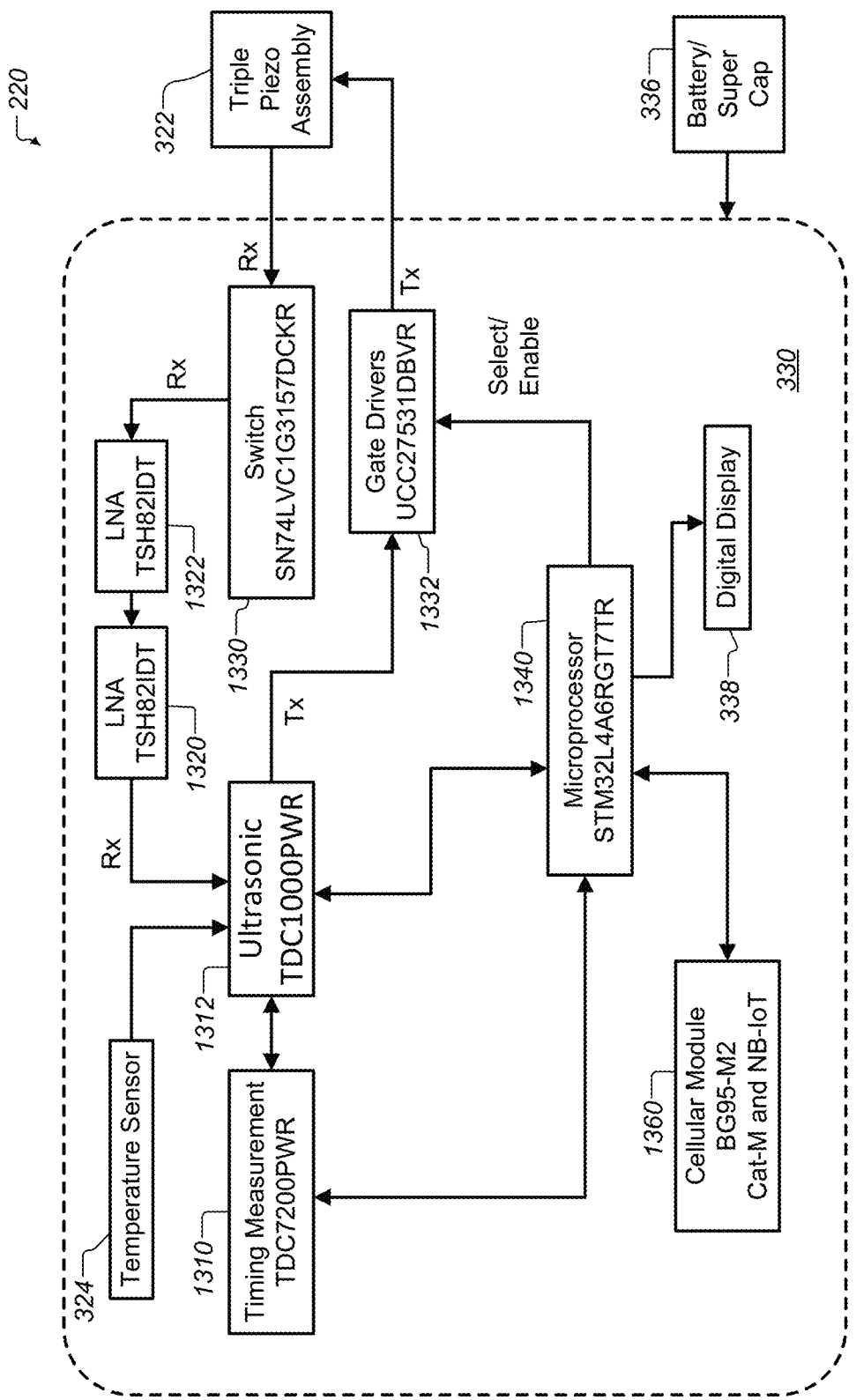
FIG. 13 is a block diagram illustrating further aspects of a connected external flow meter for monitoring, managing and optimizing water consumption, according to some embodiments.

According to some embodiments, the connected external flow meter 220 includes an electronic circuit assembly 330 having components such as: drivers; data logger(s), processor(s), power management circuitry, I/O's and other circuits, as well as firmware code and algorithms. The electronic circuit assembly 330 can be configured: to (i) drive the sensors and/or transducers; (ii) collect data from the sensors; (iii) process data from the sensors to calculate water flow rates; (iv) store data; (v) make decisions to identify water usage patterns that can cause alerts to be sent; and/or (vi) manage the transport of the data and/or calculation results as well as potential notifications via the wireless transceiver. According to some embodiments, the electronic circuitry includes a battery with an enclosure suitable for outdoor use and an antenna assembly/network. According to some embodiments, the electronic circuit assembly 330 can be coupled to a local area wireless network, particularly ones that utilize low power such as Bluetooth Low Energy (BLE). According to some embodiments, as shown in FIG. 13, the electronic circuit assembly 330 includes one or more Low Noise Amplifier (LNA) stages and filters to improve the performance when collecting data from the sensors, and thereby reducing the signal transmission power used for a successful link. The LNA is designed to pass and amplify desired signals in the selected frequency range of 1-2 MHz, and filter out signals outside the selected frequency range.

According to some embodiments, the wireless transceiver is configured to transport the data and other information from the electronic circuit assembly 330 to a computer server 240. In some embodiments, the wireless transceiver can utilize wide area networks (WAN) 210 such as cellular LTE Cat M1 or NB-IoT network(s), or other Low Power WAN (LPWAN) such as Sigfox or LoRa, and may have a fallback to a 2G cellular network. According to some embodiments, the type of wireless transport network 210 may be selected to enable multi-year battery operation of the connected external flow meter 220, without the requirement of recharging.

According to some embodiments, connected external flow meter 220 is configured to operate reliably for multiple years, including at typical outdoor temperature ranges or inside walls. According to some embodiments, connected external flow meter 220 is configured to operate reliably without change or charging of battery 336 for at least 3 years. According to some embodiments, connected external flow meter 220 is configured operate reliably without change or charging of battery 336 for at least 5 years. According to some embodiments, connected external flow meter 220 is configured operate reliably without change or charging of battery 336 for at least 7 years. According to some embodiments, the operation is independent from on-premise resources such as electrical power and network access.

According to some embodiments, connected external flow meter 220 is configured for installation in relatively tight quarters with limited physical access to the water pipe. In some cases, connected external flow meter 220 is configured for installation within walls. Such capabilities greatly increase the flexibility of installation, allowing for a broad range of use cases. According to some embodiments, the connected external flow meter 220 is separated into two parts. The first part is a set of ultrasonic transducers 322 embedded in a small connector assembly 320 suitable for use with a range of pipe sizes. The connector assembly 320 is configured to clip onto or otherwise attach onto a water pipe having a range of diameters. For example, the range of diameters can be 0.5" to 1.5". The transducers 322 in the connector assembly 320 are adjacent to each other on the same side of the water pipe and separated by a small fixed distance (e.g. in range of 0.5" to 2" separation). According to some other embodiments, the transducers 322 are positioned on opposite sides of the water pipe, pointing at each other with an angle of less than 90 degrees and offset by a distance that in some embodiments is no more than 1 inch. According to some embodiments, connector assembly 320 can also include one or more temperature sensors 324. The second part of flow meter 220 is electronic circuit assembly 330. Electronic circuit assembly 330 could include a battery pack and internal or external antenna network. According to some embodiments, the battery pack includes a Lithium Thionyl battery and a super-capacitor, to better handle high pulse current draw and improve battery life. According to some other embodiments, the battery pack may be designed to be in a stand-alone enclosure that is physically coupled to the electronic circuit assembly 330 to allow for replacement/swapping of the battery pack at a future time post initial installation. According to some embodiments, the super-capacitor is an integrated part of the electronic circuit assembly 330, so that a battery pack contains only a battery and its replacement does not replace the super-capacitor. There may also be different capacity battery packs to choose from, depending on the expected initial or incremental longevity of the connected external flow meter 220.

It has been found that water consumers in many regions of the world where water is becoming scarce and expensive do not have the tools and have limited if any visibility into their actual consumption patterns. Timely, tailored and actionable insights could inform and guide consumers on how to best optimize and manage their own water consumption and expenses. According to some embodiments, a simple, easily installed and deployed solution for monitoring, managing and optimizing water consumption and associated expenses for an entire home (indoors+outdoors) as well as a multi-tenant and/or commercial building/facility (entire site and sub units such as each apartment or office or room) is described.

FIGS. 4A-4C are diagrams illustrating a three-piezoelectric transducer assembly for use in a connected external flow meter for measuring water flow, according to some embodiments. FIG. 4A is a perspective view, showing the ultrasonic transducer assembly 322 that includes three piezoelectric transducers 410, 412 and 414. According to some embodiments, the assembly 322 is used in a clamp-on external ultrasonic meter. The three transducers are mounted in solid material carrier body 400, which according to some embodiments, is acrylic. The acrylic body 400 can include recessed pockets or openings, such as pockets 420, 422 and 424 that are formed in the body 400 to accept the transducers 410, 412 and 414, respectively. According to some embodiments, the body 400 also includes solid blocks 430, 432 and 434 that are dimensioned to provide a single solid material path for the ultrasonic energy to travel to and from the transducers 410, 412 and 414. It has been found that providing air gaps, as shown between the blocks 430, 432 and 434 can aid in reducing cross-talk interference. Also shown in FIG. 4A are electrical leads 440, 442 and 444 that are connected to transducers 410, 412, and 414, respectively. FIG. 4B is a side view showing the assembly 322 mounted externally on water pipe 200. A suitable coupling material (not shown for clarity) is provided between blocks 430, 432 and 434 and the exterior surface of the pipe 200. The coupling material should be selected to provide both adequate ultrasonic transmission properties, as well as allow the assembly 322 to be mounted on a range of pipe sizes while optimizing the contact surface area between the pipe and blocks 430, 432 and 434. Also not shown for clarity is a clamping mechanism that firmly holds assembly 322 onto the exterior surface of pipe 200. FIG. 4C is a top view showing ultrasonic transducer assembly 322 being clamped onto the outer surface of water pipe 200 using clamps 450 and 452. The selection of clamping mechanism used for securely holding transducer assembly 322 to the outer surface of water pipe 200 in general should depend upon the anticipated conditions (e.g. possibility of direct sunlight exposure, temperature ranges) the duration of anticipated deployment as well as factors such as ease of installation. According to some embodiments, a form of ratcheted fastener such as type of cable tie can be used having materials that are compatible with the anticipated pipe materials and other conditions.

It has been found that an arrangement of three ultrasound transducers, such as shown in assembly 322 in FIGS. 4A-4C, can enable auto-discovery and self-calibration such that the external ultrasonic water meter can consistently achieve highly accurate fluid flow rate measurements of comparable accuracy to the in-line water meters. The flow meters using such arrangements described herein are therefore suitable for residential water metering and sub-metering applications. According to some embodiments, the external ultrasonic water meters can be installed on pipes of differing diameters (whether known or unknown to the installer), having various pipe materials (i.e. copper, PVC or other), with having different pipe wall thicknesses, thickness tolerances, inner pipe deposits, and operating over expected varying ambient and water temperature ranges.

Figure 5:
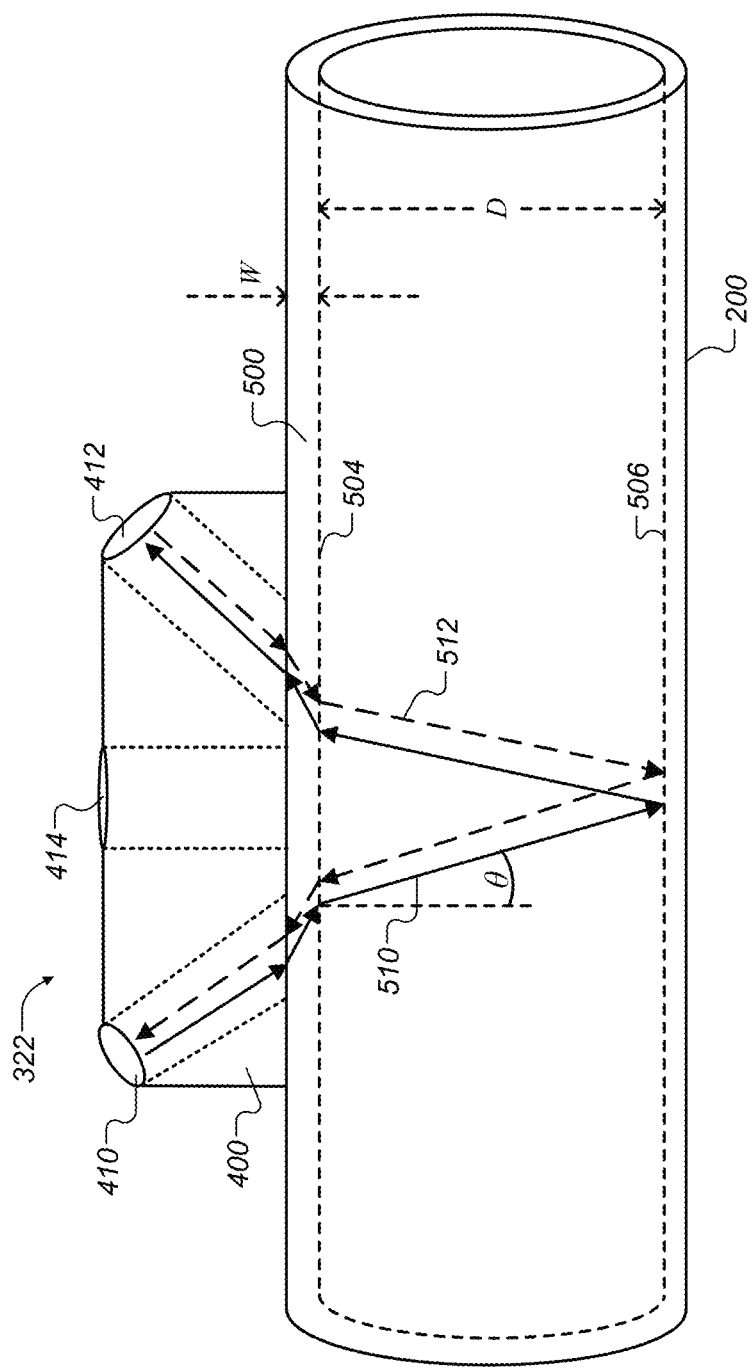
FIG. 5 is a schematic diagram illustrating aspects of an externally mounted transducer assembly forming part of a connected external flow meter for measuring water flow, according to some embodiments.

FIG. 5 is a schematic diagram illustrating aspects of an externally mounted transducer assembly forming part of a connected external flow meter for measuring water flow, according to some embodiments. The ultrasonic transducer assembly 322 is shown mounted on the outside of the pipe 200. The ultrasound wave paths 510 and 512 are shown from transducers 410 and 412, respectively. The paths 510 and 512 are shown travelling though assembly body 400, through pipe wall 500 of pipe 200 and through water within pipe 200. Note that although the paths 510 and 512 are shown separated for clarity in practice, they could be co-incident with each other, albeit in opposite directions.

To calculate the water flow rate the basic equation is:

$$Q = A \cdot V$$

where Q is the water flow rate, typically in gallons per minute, or liters per minute; A is the cross-sectional area of the inner pipe through which water flows; and V is the velocity of the flowing water. To get highly accurate measurements, for example within the 1.5% of accuracy over expected operating conditions which is typically required by meter certification bodies, one needs to have an accurate enough value of the pipe's inner diameter D to get the accurate value of A, as well as an accurate calculation of the water flow velocity V.

Following are some of the key considerations and challenges faced generally by external meters in determining accurate values for D and V. The inner pipe diameter D in FIG. 5 is shown as the distance between opposite inner pipe walls 504 and 506. For in-line, intrusive, ultrasonic water meters, the pipe diameter D can be tightly controlled as part of the design and manufacturing processes, and thus be a known constant. However, for external ultrasonic water meters, the underlying water pipe can be one of a multitude of diameters (i.e. 5/8", 3/4", 1", 1¼", 1½", etc.), and more critically, for a known external pipe diameter, the thickness of wall of the pipe (wall 500 in FIG. 5) can vary significantly based on pipe manufacturing tolerances and the type of the pipe. See, e.g.: Types K, L, or M for copper pipes, according to the "*Copper Tube Handbook*," CDA Publication A4015-14/19 from the Copper Development Association, pg. 64-66. Furthermore, with years of usage, the water pipe at the point of measurement may have accumulated deposits or have corroded on the inside, altering the inner diameter over time and thus the effective water flow cross section area. Therefore, for the case of external ultrasonic water meters, the uncertainties around the value of D can be prohibitively large to allow for water flow rate measurements with sufficient accuracy.

The velocity V can be calculated as:

$$V = (C^2 \cdot DToF)/(2L)$$

where C is the speed of sound in water, which varies significantly with the water temperature; DToF is the difference in time of flight values between upstream and downstream directions; and L represents the exact distance the ultrasonic waves travel in the water medium.

An alternate method for calculating V, which eliminates the highly temperature dependent parameter C from the calculations, is outlined in cogent engineering's "*An Implementation of Ultrasonic Water Meter using dToF Measurement*" August 2017 by Chul-Ho Lee, Hye-Kyung Jeon and Youn-Sik Hong, and in TI Application Report SNIA020 "*Ultrasonic Sensing for Water Flow Meters and Heat Meters*, April 2015", the disclosure of both of which, including the disclosures related to systems and methods for measuring flow, are incorporated by reference herein in their entirety. Here the equation for V becomes:

$$V = (L \cdot DToF)/(t_L^2)$$

where $t_L$ is the average of the upstream/downstream time it takes the ultrasonic wave to travel through the water medium.

The accurate calculation of V can then be dependent on having accurate values for (i) $t_L$, (ii) DToF, and (iii) L. In addition, depending on the ultrasonic transducer setup configuration, if the ultrasonic wave's transmission path is not parallel to the direction of the water flow in the pipe, the angle of incidence of the ultrasonic wave relative to the water flow direction as represented by θ, can also be required to calculate V. For in-line water meters, the value of L is a known constant as it is fixed by design and can be controlled in the meter manufacturing process and/or accounted for in the factory calibration process. Thus V can be calculated with sufficient accuracy based on accurate measurements of DToF and $t_L$. However, for external ultrasonic water meters, the value for L is not a constant and is not readily available. L is dependent on the pipe inner diameter D, which is not known with sufficient accuracy as discussed above. In addition, L is affected by variations in the pipe wall thickness W for a given piezoelectric transducer upstream/downstream pair placement/positioning. Furthermore, even if the values of D and W were known accurately, the fact is that L is not a constant over the expected water temperature operating range, since L varies with the variation of the speed of sound in water, caused by variations in the water temperature, as the angle of incidence of the ultrasonic waves in the water, θ, also varies with the water temperature, as well as with the specific pipe's material, creating further complications, variability and uncertainties. Therefore, for external ultrasonic water meters, the uncertainties around the value of L, as well as the ultrasonic wave incidence angle θ, can be prohibitively large, preventing water flow rate measurements with sufficient accuracy.

According to some embodiments, a two-piezoelectric configuration that is used to send and receive upstream and downstream ultrasonic waves is augmented by the addition of a third piezoelectric transducer. According to some embodiments, the third piezoelectric transducer 414 is placed in the middle of the first piezoelectric transducer 410 and the second piezoelectric transducer 412, which themselves may be aligned in a "V-bounce" or "W-bounce" configuration. For any given installation of the external ultrasonic meter on a specific water pipe, and for the duration of the installation, this three-piezo configuration is able to discrnm with sufficient accuracy, independent of air or fluid/water temperature, and for the varying water pipe parameters outlined above, the values of: (1) A, the cross section area of the inner pipe through which water is flowing; (2) L, the length the ultrasonic waves travel in water; and (3) θ, the incidence angle of the ultrasonic wave into the water.

According to some embodiments, the external ultrasonic meter 220 (shown in FIG. 2) is configured to go through an auto-discovery and self-calibration process that includes a series of initial measurements and calculations to generate initial calibration factors, parameters and offsets, as well as periodic ongoing measurements and calculations, that augment the typical upstream/downstream signaling of the ultrasonic meter, and generate data to derive sufficiently accurate values for A, L and θ that are necessary to accurately determine the water flow rate Q, and account for environmental factors such as temperature and manufacturing and installation related uncertainties such as pipe material, diameter, wall thickness, deposits, and oxidization, water temperature, aging, among others.

According to some embodiments, an external ultrasonic meter is described that actively monitors for tampering, and can share information with networked microphones to improve classification of water usage events.

Referring again to FIG. 3, according to some embodiments, the connected external flow meter 220 can be configured to go through an initial self-calibration process where the water main or supply valve is shut off to ensure that no water is flowing through the pipe at the location where the connected external flow meter is coupled. The self-calibration process can include generating one or more calibration factors used in calculating the distance an ultrasonic acoustic wave travels in the water medium. Examples of such calibration factors can include (but are not limited to) time period offset constants. The time period offset constants can be used to compensate for mismatches in the ultrasonic pulse time-of-flight measured in upstream and downstream directions in a zero water flow condition. Such mismatches or asymmetries could be related to the installation and/or manufacture of the connected external flow meter 220. The self-calibration process may be associated with a specific pipe temperature measured through the temperature sensor and the resulting values may be dependent on and adjusted for conditions when the temperature of the pipe or the temperature of the water flowing inside the pipe, is different from the self-calibration temperature. Such calibration process may be used to adjust for specific offsets that could provide time of flight adjustments. Other calibration processes could be used as appropriate to the requirements of specific applications in accordance with various embodiments of the invention.

According to some embodiments, the temperature compensation is used to improve the accuracy of the delta time-of-flight measurement at very low and zero flow water rates through the water pipe that could lead to false indications of low level water flow where the water is still and not flowing through the pipe. According to some embodiments, the temperature compensation is carried out in electronic circuit assembly 330, such as in the processor. Data inputs from the temperature sensor coupled to the water pipe are used to compensate for known time of flight variations relative to temperature, characteristic of ultrasonic waves of predetermined frequencies travelling in water.

According to some embodiments, where multiple water pipes serve an individual apartment, multiple connected external flow meters 220 are installed per apartment, capturing apartment level water consumption in a specified period as well as an apartments meter reading as the aggregation of the meter readings from all of the connected external flow meters 220 associated with the specific apartment.

According to some embodiments, a local area network extension, such as a Bluetooth Low Energy network, may be set up and utilized for secondary applications. Examples of such secondary applications include, but are not limited to, location based services as well as messaging services. Examples of messaging services include: (i) generating confirmation and time stamps of delivery of packages that contain a matching BLE, or other relevant network, tags and are picked up when the package comes into proximity to the extended local network; (ii) identification of traffic of interest coming into or out of a home/apartment/site such as kids with backpacks, bicycles, vehicles, etc.; (iii) homing beacons for guiding UAVs to a specific home/site address; and (iv) electronic messages and/or commands delivered or queued to be delivered to user devices, vehicles and/or assets once such assets come into proximity of the site.

Figure 6:
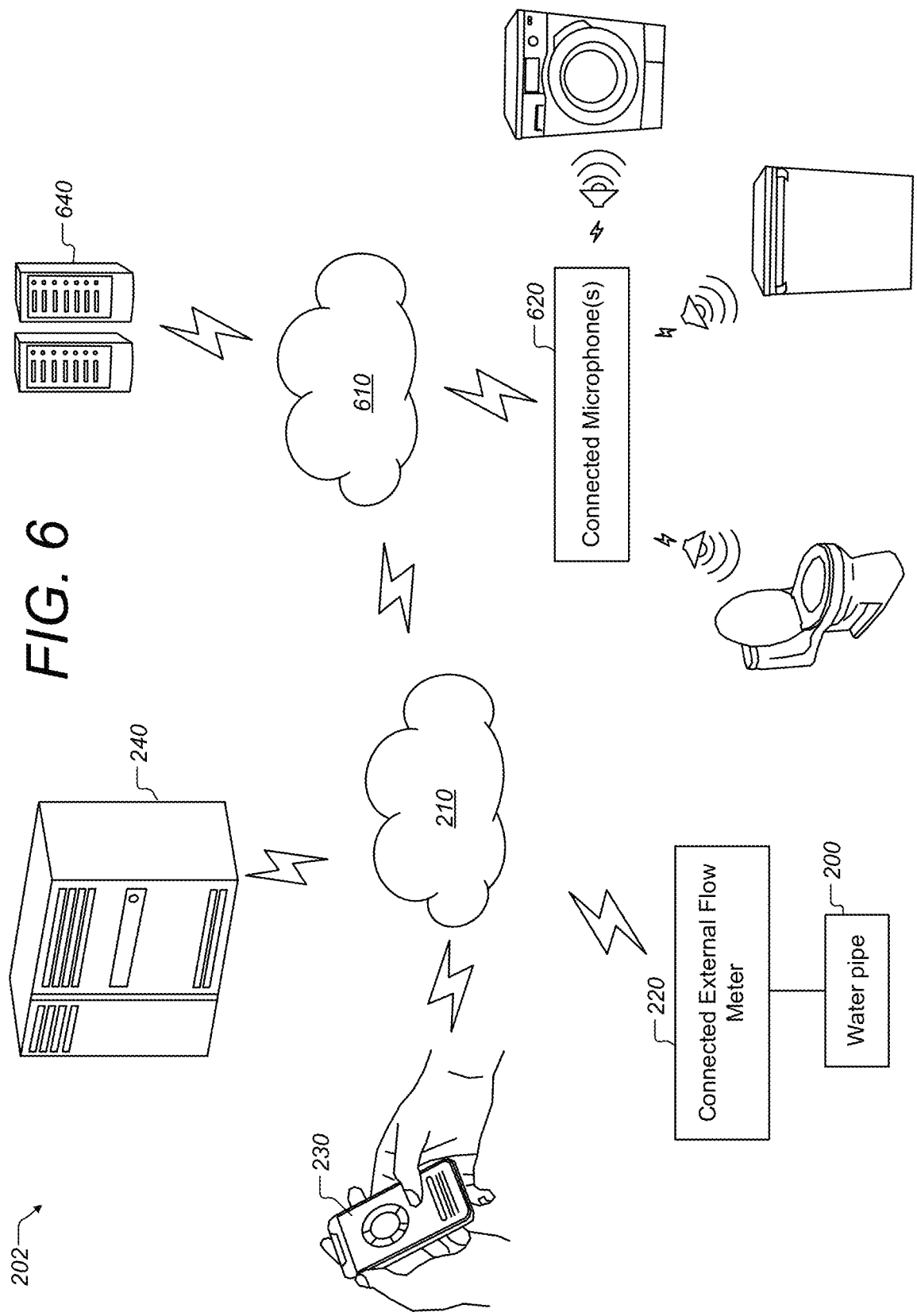
FIG. 6 is a conceptual diagram illustrating a connected metering system that includes a connected external flow meter cooperating with network connected microphones, according to some embodiments.

FIG. 6 is a conceptual diagram illustrating a connected metering system that includes a connected external flow meter cooperating with network connected microphones, according to some embodiments. The Connected external flow meter 220 is placed away from network connected microphone(s) 620. According to some embodiments, connected microphone(s) 620 form part of a home automation system or virtual assistant AI technology, such as Amazon's Alexa technology. The microphones 620 can be configured and positioned to capture audio recordings, including when water consuming appliances and fixtures are operating in the home. The microphones 620 can be connected via network 610 to a processing system 640 that uses classifiers to correlate audio signatures to water usage. The classification of the audio signatures can be improved with classified water flow data that has separately correlated water flow data to the type of consuming appliance or fixture. The audio classification can also be used to improve the classification of water flow data from a connected external flow meter 220. Examples of classifications which connected external flow meter 220 and connected metering system 202 can distinguish and assign include (but are not limited to): the operation of various household water consuming devices (e.g. toilet, dishwasher, clothes washer, sink, shower, etc.); the operation of outdoor water use (e.g. irrigation) from indoor use; conditions or failure of water consuming devices (e.g. leaking toilet); and parameters for various water consuming devices (e.g. average volume of water used per toilet flush). According to some embodiments, one or more of the example classifications can be made by the system 202 such as shown in FIG. 2, without aid of connected microphones.

According to some embodiments, the connected external flow meters are installed downstream from in-line water sensors, such as the in-line meters typically used by water utilities to measure the water flowing on a central line from the water utility into a residence or a multi-tenant building. The connected external flow meters 220 may also be part of a network of other sensors, such as a temperature sensor in the cistern of a toilet, providing data that can enhance knowledge of water usage or usage conditions. A process of keeping dishwashers and washing machines operating takes the classification of water usage and determines the number of appliance operating cycles, and can be used for managing other inputs needed for machine operation, such as preventive maintenance and for securing supplies needed for operating the appliance and avoiding supply exhaustion.

Figure 7:
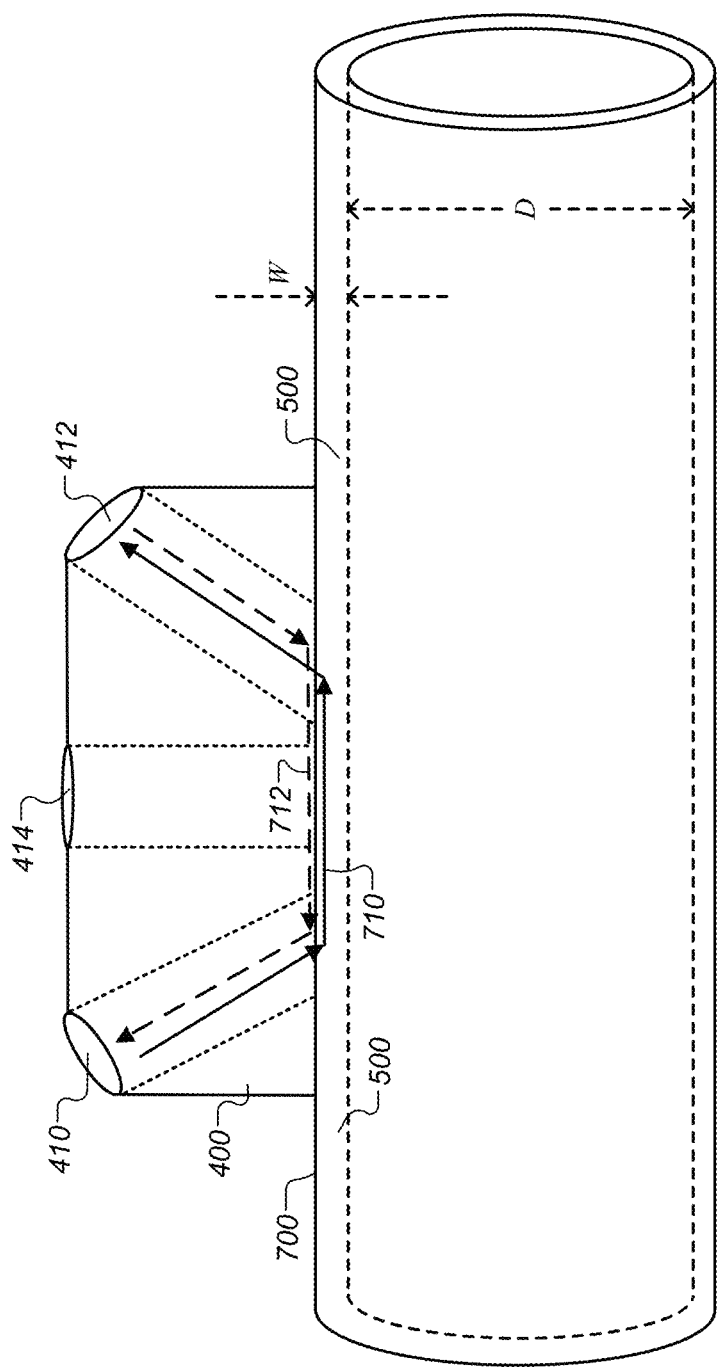
FIG. 7 is a schematic diagram illustrating surface waves being measured by an externally mounted transducer assembly forming part of a connected external flow meter for measuring water flow, according to some embodiments.

FIG. 7 is a schematic diagram illustrating surface waves being measured by an externally mounted transducer assembly forming part of a connected external flow meter for measuring water flow, according to some embodiments. The wave paths 710 and 712 are shown from transducers 410 and 412, respectively. The paths 710 and 712 are shown travelling though assembly body 400 and along the external surface 700 of wall 500 of pipe 200. Note that although the paths 710 and 712 are shown separated for clarity, in practice they could be co-incident with each other, albeit in opposite directions. According to some embodiments, the connected external flow meter employs active techniques to detect tampering. The active techniques can offer an improvement over the mechanical tamper proofing that is typically detected when next visually inspected. The active tamper detecting techniques can include: (1) if measured values of the time of flight of signals measuring water flow are outside of a defined reasonable range after having been in the range; (2) if the measured inner diameter of the pipe has increased or decreased significantly during operation in a short period of time; (3) if surface waves, $t_s$, shown in FIG. 7 as wave paths 710 and/or 712, travelling between the transducers 410 and 412, are no longer detected, or have a time of flight outside the expected time window, it can be determined that the connected external flow meter has been detached from a pipe; (4) the connected external flow meter 220 is equipped with a securing band which can provide electrical connectivity for a resistance or voltage or magnetic test, where if after passing the resistance or voltage or magnetic test the meter fails the test, then it may have been tampered with; and (5) the connected external flow meter may use WAN technology, including cellular networks for their connectivity. A sudden and then sustained loss of signal may be an indicator of tampering. The signal strength of other connected external flow meters in the vicinity using the same WAN may also be compared to determine tampering.

According to some embodiments, one or more connected external flow meters 220 are installed downstream from one or more other connected external flow meters. This could be the case when the water line(s) that serve an apartment also serve one or more apartments, as in some multi-tenant buildings.

Figure 8:
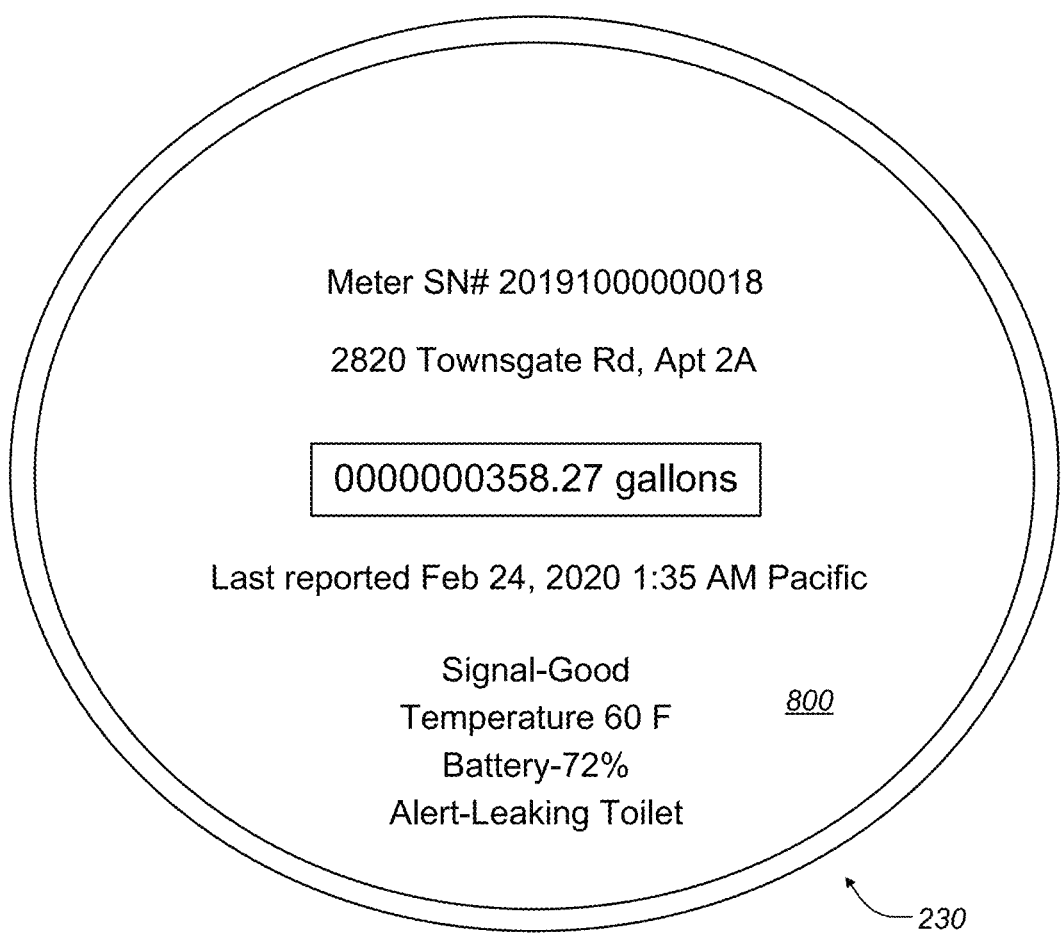
FIG. 8 is an illustration of a virtual status display of a connected metering system, according to some embodiments.

FIG. 8 is an illustration of a virtual status display of a connected external flow meter forming part of a connected metering system, according to some embodiments. The connected external flow meter 220 can have a digital display that shows the cumulative meter reading of water usage, and may also have a Quick Response (QR) Code printed, etched, or otherwise placed on the exterior of the connected external flow meter. Scanning of the QR code will bring up the virtual status page 800 for the connected external flow meter on user interface 230. The virtual status page 800 can include, but is not limited to: the current or most recently reported meter reading; water temperature; flow rate and direction; battery health; and event notifications. According to some embodiments, the virtual status page 800 may be in lieu of a physically integrated digital display. The digital display on the connected external flow meter as well as the virtual status page may show the net water usage for that apartment for a given time period, in lieu of or in addition to the cumulative meter reading, in cases where connected external flow meters are cascaded on water pipes that serve multiple units.

According to some embodiments, the connected external flow meter 220 has power management schemes that limit the frequency and modes of connectivity to the cellular network, such as LTE CAT-M's Power Saving Mode (PSM). Such schemes can allow for very low power consumption for idle states and for reconnection to the network (e.g. by not relying on a power consuming re-registration process), or can completely remove power from the cellular module to eliminate leakage current inherent in electrical semiconductor circuits when data is to be sent infrequently (e.g. at most once per day). Other examples of power management schemes include utilizing event detection within the flow meter device, which can determine the start and stop of individual and incremental water flow events. The processing of flow data by the processor can be limited to the times when there are water flow events, which is typically less than 3% of the time, or less than one hour of water flow in a typical home in a 24 hour day. Other examples of power management schemes include dynamically varying the time interval between ultrasonic measurements to reduce the power consumption when there are no detected water flow events or to achieve higher resolution during water flow events; and operating in a low power preinstallation state without wireless communications or water flow measurement. The connected external flow meter can be put into a low power mode upon completion of testing in the manufacturing process and stay in such preinstallation state until detecting a surface wave, $t_s$, shown in FIG. 7, between the two flow measuring transducers, which indicates that a connected external flow meter is initially being attached to a pipe. This preinstallation state, by also disabling wireless communications, can act as an air shipment safe mode as well.

According to some embodiments, the connected metering system and/or the connected external flow meter includes data compression schemes that reduce the amount of data that needs to be transmitted over the air, reducing wireless data transport costs and the time spent transmitting data, thus saving power.

According to some embodiments, when measuring time-of-flight, the connected external flow meter uses masking of certain time windows to filter out signals due to undesired reflections. The masking windows are predetermined values, and can vary according to the detected pipe size or pipe material.

According to some embodiments, the inner diameter can be calculated from comparing and matching the measured time-of-flight of the ultrasonic waves/pulses and their differences to a set of expected calculated time of flight numbers/times in water with an orthogonal path across the pipe associated with water pipes of different standard diameters (i.e. 5/8", 3/4", 1", 1 1/4", 1 1/2", etc.). Based on the above comparison, the most probable water pipe diameter can be selected and such pipe diameter can be associated with the connected external flow meter installed at a given home/apartment/site.

According to some embodiments, user interface 230 is provided and could be displayed on a user device such as a cellphone, tablet, computer or other connected electronic display, through an application, a web portal or a message (text, e-mail, push notification or other). An example of user interface 230 is shown in FIG. 8. The status page 800 includes data and insights related to actual water consumption patterns and categories, in near real time, as well as various types of notifications and alerts in case of aberrant consumption patterns, identified water consumption optimization opportunities, or consumption trending into higher priced tiers. Such user interface 230 accesses content from a backend server 240 to which it communicates through network 210 (e.g. Internet, cellular network or other public or private network). The user interface 230 may have a unique URL for access to the metering data for connected external flow meters, that URL may be represented in a Quick Response (QR) Code, available in one or more places, such as on the connected external flow meter 220, on an accessible surface in the apartment or unit, or in a management office. The user interface 230 may serve as the primary means of displaying meter water usage data, and may represent the data from one or more connected external flow meters, as individual meters or aggregated logically per apartment, unit, suite, per building, or campus, reflecting the amount of water used during a certain period. The QR Code may also reflect the location of data to support an augmented reality view of the connected external flow meter.

Figure 9:
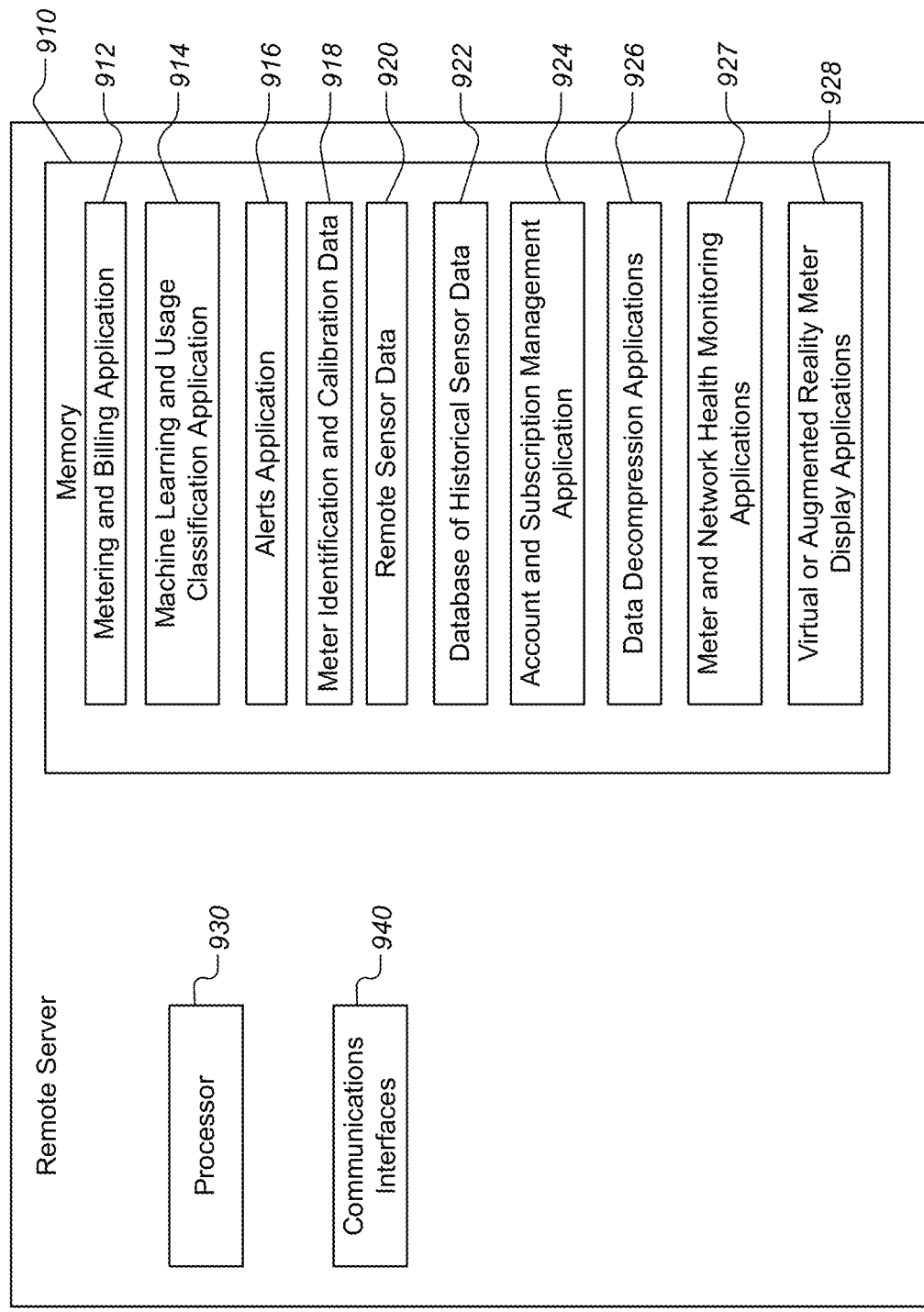
FIG. 9 is a block diagram of a server system which communicates with and forms part of a connected metering system for monitoring, managing and optimizing water consumption, according to some embodiments.

FIG. 9 is a block diagram of a server system which communicates with and forms part of a connected metering system for monitoring, managing and optimizing water consumption, according to some embodiments. Backend server 240 may be located in the cloud, a datacenter, or on premise. Server 240 can provide various micro-services, including providing a database containing the raw and processed data for each home/apartment/site's water consumption details that is received/collected from a connected external flow meter. The processed data may include a home's actual water consumption per event/use matched/ mapped onto one or more event types from a set of a predefined or user identified set of water consumption categories. The processed data can also include: (1) the diameter of the water pipe the connected external flow meter is installed upon; (2) the meter readings that reflect the cumulative water use as typical with traditional water meters; (3) the relationship between multiple connected external flow meters that are installed on the same apartment and the aggregation of water usage data from that apartment; (4) the relationship between multiple connected external flow meters that are installed on different apartments that have cascaded water lines and the determination of the differential water usage to reflect the correct water usage for each apartment; and (5) status information as to the health and performance of the connected external flow meter, such as its self-calibration values, remaining battery life, wireless signal strength, health of the connected external flow meter and detected tampering.

Server 240 can also be configured to provide a Machine Learning (ML) Engine that includes: (1) a Supervised ML algorithm used to classify and map actual water consumption data, such as the water flow rates or water flow volumes relative to time (gallons per second, per minute or hour for instance) into a predefined and/or user identified set of water consumption categories such as landscaping, showers, laundry, dishwasher, pool, toilet, tap, etc.; and (2) Machine Learning algorithm(s) that analyze on an ongoing basis a given home/apartment/site's historic water consumption to learn the regular/common patterns of consumption and then ingest new data coming in from the connected external flow meter 220 to identify certain types of possibly aberrant/ unusual water flow patterns that could be indicative of water waste, including steady indoor/outdoor water leaks, broken sprinklers, leaks with a periodicity such as those experienced from worn out toilet flaps. According to some embodiments, Machine Learning algorithms are used to match each target home/site's actual water consumption patterns with the most effective water optimization solutions from a predefined set of water conservation solutions, that may include but not be limited to smart irrigation systems, low water landscaping solutions, pool covers, low flow showers, more water efficient toilets and appliances, water capture systems, and other more water efficient options from a marketplace to facilitate the adoption. The ML engine can also include Machine Learning algorithms which analyze when and how much water is flowing from multiple connected external flow meters per multi-tenant building to identify cascaded connected external flow meters, such that the certain connected external flow meters are also measuring the usage of other downstream apartment(s), so that differential measurement and calculation techniques can be used, or corrective plumbing changes can be implemented.

Server 240 can also be configured to provide: a notification engine to send alerts and messages to the consumer; a secure session management for the transport of commands and data to and from the connected external flow meter, and/or account management and activation services. Examples of services that can be provided include: coordinate account setup; providing current installation instructions; connected external flow meter activation; pairing with a physical home/apartment/site; and subscription and/or payment management. Such services could require data including, but not limited to: the physical address of the home/apartment/site; credit card info; contact info (email address, cell phone/text number, consumer preferences); connected external flow meter serial number; SIM card ICCID; IMEI and/or ESN number.

Server 240 can also be configured to provide: data decompression applications to process the compressed meter data; and/or meter and network health monitoring applications that monitor and report on the health and projected longevity of connected external flow meters and the quality of the network connectivity.

Server 240 can also be configured to provide applications to capture specific operational insights for apartment owners and property managers, such as estimation of the number of individuals living in an apartment, based on the number of showers and toilet flushes or other water usage patterns in a specified period, unexpected water use in apartments that are tagged to be unoccupied, and generating alerts for the exception cases.

According to some embodiments, a subset of the components shown in the example of FIG. 9 may be included in server 240. In some embodiments, server 240 might include processor 930 and communication interfaces 940, while memory 910 might include remote sensor data 920 and metering and billing application 912. The memory 910 might omit machine learning and usage classification application 914, alerts application 916, meter identification and calibration data 918, database of historical sensor data 922, account and subscription management application 924, data decompression applications 926, meter and network health monitoring applications 927 and virtual or augmented reality meter display applications 928. According to some embodiments, a more fully functioned server 240 might additionally include machine learning and usage classification application 914, database of historical sensor data 922, and virtual or augmented reality meter display applications 928.

Figure 10:
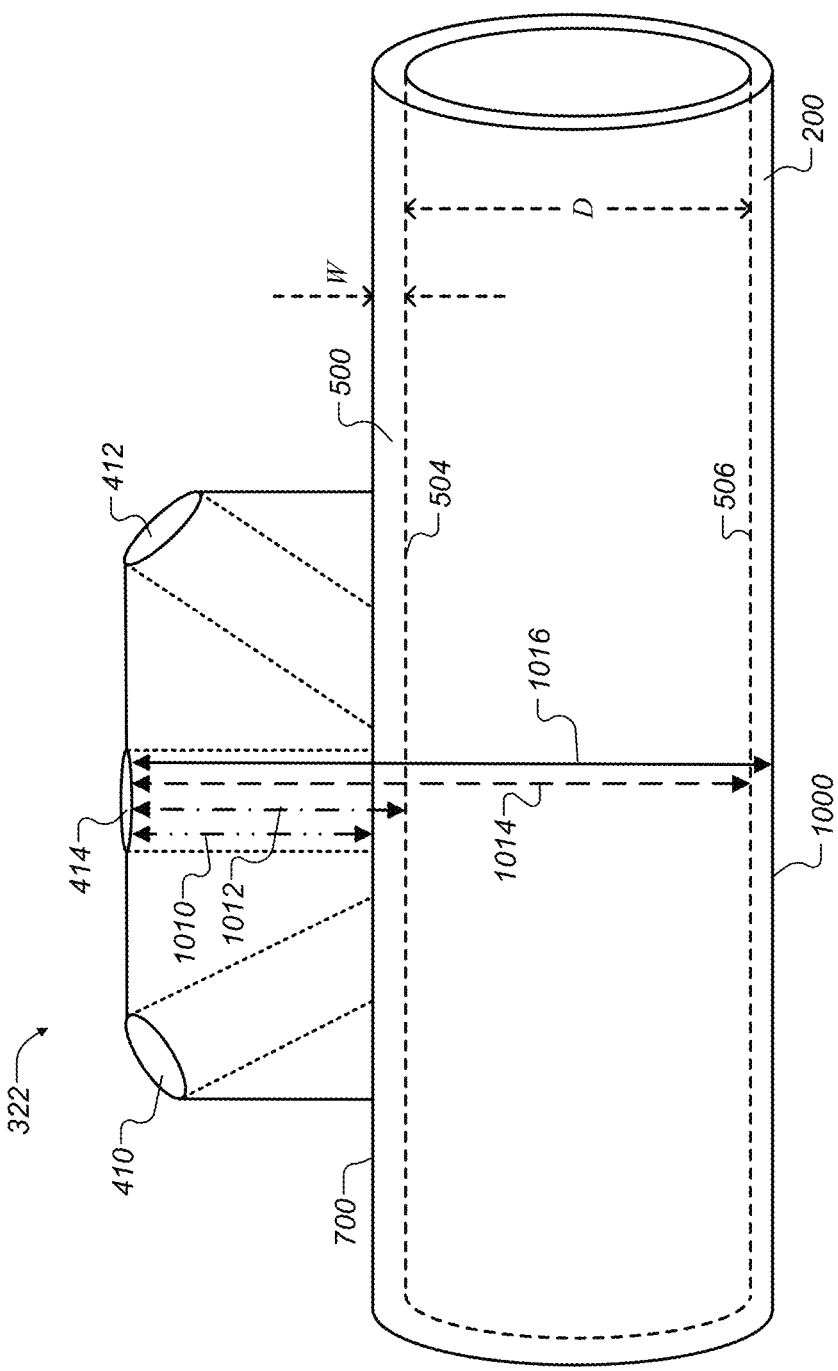
FIG. 10 is side view diagram showing an ultrasonic transducer module configured for self-calibration and self-determination of the inner diameter of the pipe, according to some embodiments.
Figure 11:
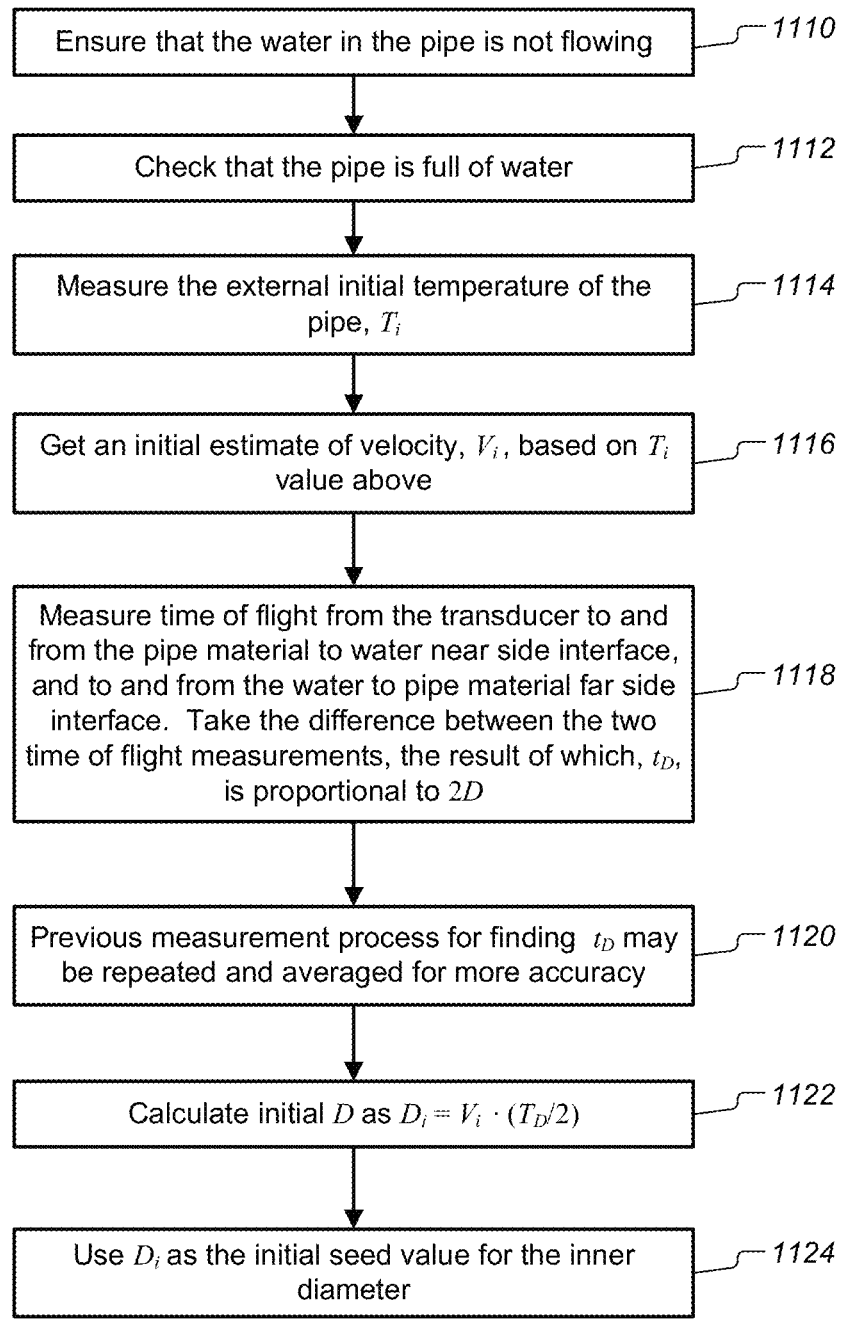
FIGS. 11 and 12 are block diagrams illustrating aspects of determining the inner pipe diameter, according to some embodiments.
Figure 12:
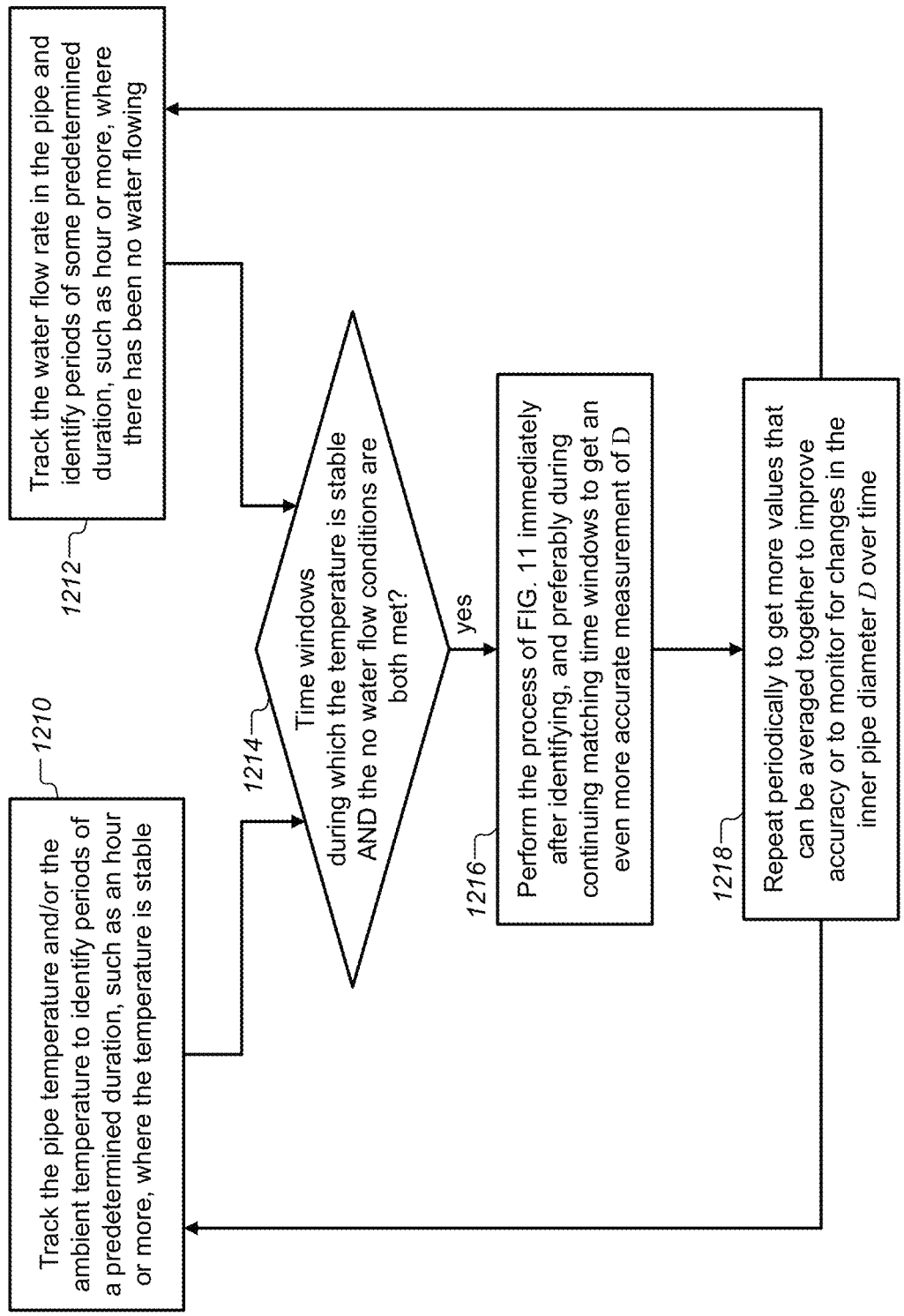

According to some embodiments, the connected external flow meters have a flow metering auto-discovery and self-calibration process that can include an accurate determination of the inner pipe diameter D. As described supra, accurately measuring the inner diameter D of a pipe filled with a liquid of unknown temperature is challenging. The temperature of the fluid can be materially different from the temperature of the pipe during water flow events. This can be the case in particular if the pipe material is not a good thermal conductor, such as in the case of PVC, or when the water in the pipe at the point of measurement has moved close to ambient air temperature which may be much higher or lower than the subterranean somewhat insulated water that comes flowing through during a water use event FIG. 10 is side view diagram showing an ultrasonic transducer module configured for self-calibration and self-determination of the inner diameter of the pipe, according to some embodiments. FIGS. 11 and 12 are block diagrams illustrating aspects of determining the inner pipe diameter, according to some embodiments. Through the process described below, and also illustrated in FIGS. 10-12, the value of D can be accurately determined. In FIG. 11, block 1110, the water in the pipe is ensured to be not flowing. In block 1112, the pipe is verified to be full of water. In block 1114, the external initial temperature of the pipe $T_i$, is measured. In block 1116 an initial estimate of water velocity $V_i$ based on the value of $T_i$. In block 1118, ultrasonic pulses are sent from a vertically aligned piezoelectric transducer (e.g. transducer 414 in FIG. 10). Referring to FIG. 10, four reflected acoustic waves should be received back by the transducer 414. The four waves correspond to reflections from: the exterior surface 700 of the pipe (path 1010); the near-side interface between pipes inner surface 504 and the water (path 1012); the far-side interface between the inner surface 506 and the water (path 1014); and the far-side outer pipe surface 1000 to air interface (path 1016). There will likely be additional reflected acoustic waves detected which are resulting from secondary and tertiary reflections of the primary reflections. The delta time-of-flight between the reflected wave path 1012 and wave path 1014 corresponds to the time, $t_D$, that the acoustic wave takes to travel a distance of 2D. Referring again to FIG. 11, in block 1120, the measurement processes for finding $t_D$ may be repeated and averaged for more accuracy. In block 1122, an initial value for D is calculated from the relationship: $D_i=V_i \cdot (t_D/2)$. According to some embodiments, some of the secondary and tertiary reflections may also be utilized in calculating an averaged value of 2D, further increasing the accuracy and robustness of the value of $D_i$. In block 1124 we use $D_i$ as the "seed" value for the inner diameter.

According to some embodiments, accuracy of the seed value $D_i$ can be further improved through the process illustrated in FIG. 12. In block 1210, using temperature sensors (e.g. sensor(s) 324 in FIG. 2), the pipe temperature and/or the ambient temperature can be tracked to identify periods of a predetermined duration, such as an hour or more, where the pipe or ambient temperature is stable. According to some embodiments, the criterion in block 1210 is less than 2° C. change for 10 minutes or more. According to some other embodiments, the criterion in block 1210 is less than 1° C. change for 20 minutes or more. According to yet other embodiments, the criterion in block 1210 is less than 0.5° C. change for 30 minutes or more. In block 1212, the water flow rate in the pipe can be tracked and periods of some reasonable duration, such as an hour or more, where there has been no water flowing can be identified. In block 1214, "measurement windows" are identified, when both conditions in blocks 1210 and 1212 are satisfied. During such measurement windows, in block 1216, the water temperature can be assumed to be very close to the ambient and/or pipe temperatures. The process described in blocks 1110 through 1122 in FIG. 11 can be repeated to get a revised and more accurate value of D. In FIG. 12, block 1218, the process described in blocks 1210 to 1216 can be repeated several times, or on an ongoing basis, to further refine the accuracy of the calculation for the value D as well as monitor for long term aging effects of the pipe.

According to some embodiments, a method for calculating an accurate determination of L will now be described in further detail. As described supra, for an external ultrasonic flow meter to get an accurate value of the distance L traveled by the acoustic waves in a fluid inside a pipe is a significant challenge as L tends to vary with the fluid temperature, and is dependent on the pipe medium as well as the exact pipe wall thickness and the pipe inner diameter D. Through the process described, we are able to accurately determine the value of L for a given flow meter installation on a specific pipe, as well as capture the value of L as it varies dynamically over time based on changes in fluid temperature, including during flow events, and changes in pipe conditions. Considering the relationship: $L=(t_L/t_D) \cdot D$, accurate values of $t_D$ and D can be obtained from the process shown in FIGS. 10-12. Next, an accurate value of $t_L$ is calculated through a process that may depend on the specific configuration of the piezoelectric transducer assembly outlined below. This value of L can be used in the accurate instantaneous calculations of V, since this value of L captures the relevant parameter variations associated with the specific flow meter installation, as well as the variations due to the water temperature at the time of each delta-time-of-flight measurement.

Considering a V-bounce piezo configuration, we can determine $t_L$ by first measuring $t_0$, the time of flight (ToF) measured in the upstream and downstream directions through the transducers positioned at each end of the assembly (e.g. transducer 410 or 412 shown in FIGS. 4A-C, 5, 7 and 10). $t_0$, will include $t_L$ plus the time the acoustic waves travel through any coupling media, the pipe walls, and delays associated with the electronic circuitry. Next, a measurement is made of $t_S$: the time-of-flight that is associated with the acoustic waves traversing the upper pipe wall surface (directly beneath the piezoelectric transducers) in the upstream and downstream directions (e.g. wave paths 710 and 712 shown in FIG. 7). In the common industry art of making ultrasonic delta time-of-flight flow measurements, this surface acoustic wave $t_S$ is normally not measured and/or discarded or filtered out, as it is typically considered noise and not useful in calculating any information on fluid flow. However, the averaged $t_S$ value can be used in deriving a value for $t_L$ with $t_L=t_0-t_S$, or alternatively $t_L=t_0-(a \cdot t_S-b)$, where "a" is a scaling factor that can be factory set or determined dynamically during the self-calibration process and "b" is a constant offset that can similarly be factory set or determined dynamically during the self-calibration process. The value of $L=(t_L/t_D) \cdot D$ can now be calculated. Since $t_D$ captures the variations in time-of-flight in the water that are the result of temperature variations of the flowing water, the value of L calculated above can be compensated for the effect of water temperature changes in real time as individual ultrasonic flow measurements are made. The angle of acoustic incident wave into the water, $\theta$, can be calculated if needed, based on the accurate values of D and L. In several embodiments, the equation for V, the velocity of the acoustic wave in the water, can be modified to exclude the parameter $\theta$, as $\theta$ is a dependent variable on D and L and may be substituted out.

Considering a W-bounce piezo configuration, times-of-flight measurements can be made in upstream and downstream directions in a three-piezo assembly configuration. The measurements can yield: $t_1$, an average time of flight from an end piezo (e.g. transducer 410 or 412 shown in FIGS. 4A-C, 5, 7 and 10) to the middle piezo (e.g. transducer 414 shown in the same Figures) in each direction; and $t_0$: average time of flight in the upstream and downstream directions through the transducers positioned at each end of the assembly (e.g. transducer 410 or 412). $t_L=2 \cdot (t_0-t_1)$ can then be measured. The value of $t_L$ can then be obtained to get $L=(t_L/t_D) \cdot D$. Since $t_D$ captures the variations in time of flight in the water that are the result of temperature variations of the flowing water, the value of L calculated above will then be compensated for the effect of water temperature changes. The angle of acoustic incident wave into the water, $\theta$, can be calculated if needed, based on the accurate values of D and L. Alternately, the equation for V, the velocity of the acoustic wave in the water, can be modified to exclude the parameter $\theta$, as $\theta$ is a dependent variable on D and L and may be substituted out.

Note that in the discussion of calculating an accurate determination of L for both the V-bounce and W-bounce discussions, supra, the measurement of $t_D$ by the vertically oriented transducer in calculating L, should be performed contemporaneously with the measurements are made by the end piezos (e.g. transducers 410 or 412) such as for measuring $t_0$ and/or $t_1$ so that the same flow and temperature conditions can be assumed in the relationship $L=(t_L/t_D) \cdot D$. In general, making the measurements (using the vertically oriented transducer 414 and using the end transducers 410 and 412) closer in time tends to increase accuracy by minimizing the effects of potential temperature differences between the different measurements of the flowing medium.

According to some embodiments the measurements made using the vertically oriented transducer 414 and the measurements using the end transducers 410 and 412 are performed within 10 seconds of each other. According to some other embodiments the measurements made using the vertically oriented transducer 414 and the measurements using the end transducers 410 and 412 are performed within 1 second of each other. According to yet some other embodiments the measurements made using the vertically oriented transducer 414 and the measurements using the end transducers 410 and 412 are performed within 100 ms (0.1 second) of each other. According to yet some other embodiments the measurements made using the vertically oriented transducer 414 and the measurements using the end transducers 410 and 412 are performed within 1 ms of each other.

Other processing techniques (e.g. compensation processes, calibration processes and/or calculation processes) and other hardware and/or device configurations (e.g. piezo configurations) can be utilized alone or in combination with each other, as appropriate, according to the requirements of specific applications in accordance with various embodiments of the invention. Such processes can be utilized in the systems such as (but not limited to) the connected metering system of FIG. 2, and flow meters including (but not limited to) the connected external flow meter of FIG. 3.

According to some embodiments, in order to conserve on power consumption as well as other reasons, the flow meter event detection process can include: (1) using significant changes to the standard deviation of recent delta ToF time-series values. The standard deviation of a group of delta ToF values, say the last 10, 20, or 30, is calculated and tabulated as a time series, or alternatively the standard deviation of the running average of such delta ToF time series. The start and potentially the end of water flow events can be tagged by significant impulses in the standard deviation time series. Since water flows during a small fraction of a day's 24 hours, knowing the exact start and end of water flow events can drive operational efficiencies in the connected external flow meter in computation, data processing, and water flow calculations, significantly lowering power consumption.

FIG. 13 is a block diagram illustrating further aspects of a connected external flow meter for monitoring, managing and optimizing water consumption, according to some embodiments. The diagram is similar to FIG. 3, but provides further detail of example componentry and interconnections that might be used for electronic circuit assembly 330 in particular. According to some embodiments, the connected external flow meter 220 is designed to be battery powered without recharging for several years. In order to accomplish this, the flow meter 220 may utilize power management techniques that reduce power consumption. Upon completion of the manufacturing process, the flow meter 220 enters a low-power state and at a predetermined infrequent rate transmits and attempts to receive ultrasonic pulses through the piezo assembly 322. This continues until detecting a surface wave, $t_s$, as shown in FIG. 7, between the two flow measuring transducers (e.g. transducers 410 and 412 shown in FIGS. 4A-C), which indicates that a flow meter 220 is initially being attached to a pipe. According to some embodiments, the triggering event could be the detection of an upstream and/or downstream ToF signal. This preinstallation state also completely removes power from the cellular module 1360, preventing power loss due to quiescent leakage inherent in semiconductors. After detecting connection to a pipe filled with medium, the flow meter 220 periodically allows the processor 1340 to sleep after initiating a flow measurement sequence, and to wake back up either through timing on the processor's internal real time clock or being triggered by an interrupt from the timing measurement processor 1310. A receive path switch 1330 allows the receive paths to share the cascaded LNAs 1320 and 1322 instead of needing cascaded LNAs dedicated to each of the three ultrasonic receive paths from the piezo assembly 322, further reducing the power consumed. The connected external flow meter 220 typically accumulates the sensor detected flow event data for transmission no more often than once per day by cellular module 1360 to server 240 (shown in FIGS. 2 and 9), unless an event requiring faster notification such as a major leak is detected, and after completion of each wireless data session, power can again be completely removed from cellular module 1360. If data transmissions more frequent than once per day are needed, the cellular module 1360 can be put into the LTE CAT-M Power Saving Mode (PSM) and continually powered by battery 336, which does not require re-registration before each data transmission, and is more power efficient than re-powering the cellular module 1360 for the more frequent transmissions. The data compression by application 313 (shown in FIG. 3) reduces the amount of data and therefore the transmission time to server 240, reducing power consumption. The processor 1340 also dynamically varies the frequency of ultrasonic measurements by ultrasonic controller 1312, increasing the frequency of measurements when higher resolution flow data is desired, and reducing the frequency of measurements in between detected flow events to reduce power consumption. The classification of flow data into certain water consumption appliance types can be power intensive and be performed off of connected external flow meter 220 in machine learning and usage classification application 914 on server 240. The digital display 338 can be optionally not included, further saving battery power, provided that alternative displays 928 on server 240 (shown in FIG. 9) or metering and billing application 912 on server 240 are sufficient for the use case.

According to some embodiments, a subset of the components shown in the example of FIG. 13 may be included in flow meter 220. In some embodiments, meter 220 might include piezo assembly 322 and electronic circuit assembly 330 while omitting battery 336. The electronic circuit assembly might include processor 332, timing measurement processor 1310, ultrasonic controller 1312, processor 1340, cellular module 1360 and gate drivers 1332, while omitting temperature sensor 324, LNAs 1320 and 1322, switch 1330, and digital display 338. According to some embodiments the flow meter might additionally include battery 336 and the assembly 330 might additionally include either LNA 1320 or 1322, and temperature sensor(s) 324.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the body of work described herein is not to be limited to the details given herein, which may be modified within the scope and equivalents of the appended claims.

What it claimed is:

1. An ultrasonic flow meter comprising:
    a carrier assembly configured to be externally mounted on a pipe to measure flow in a flow direction;

a first ultrasonic transducer mounted to the carrier assembly at an oblique angle relative to the flow direction; and
a second ultrasonic transducer mounted to the carrier assembly at an oblique angle relative to the flow direction;
a third ultrasonic transducer mounted to the carrier assembly, at a right angle relative to the flow direction;
a memory configured to store sensor data and one or more applications;
at least one processor configured to communicate with the first, second, and third ultrasonic transducers and capable of:
causing the third ultrasonic transducer to transmit an ultrasonic pulse;
receiving from the third ultrasonic transducer a signal indicative of receipt of a first reflection of the ultrasonic pulse, where the first reflection is received after the ultrasonic pulse has: i) propagated through a near-side wall of the pipe, ii) propagated through a medium within the pipe, iii) reflected off an interface between the medium and a far-side wall, iv) propagated back through the medium within the pipe; and v) propagated back through the near-side wall of the pipe;
receiving from the third ultrasonic transducer a signal indicative of receipt of a further reflection of the ultrasonic pulse, where the further reflection is received after the ultrasonic pulse is reflected off the interface between the medium and the far-side wall at least a second time;
determining a pipe cross-sectional area based upon a time difference between receipt of the first reflection and receipt of the further reflection by the third ultrasonic transducer;
calculating a flow rate for the medium based on time of flight measurements made between said first and second ultrasonic transducers and the determined pipe cross-sectional area.

2. The flow meter of claim 1 wherein the at least one processor is further capable of calculating the flow rate of the medium based on the time of flight measurements by performing temperature compensation based at least in part on one or more time of flight measurements made using said third transducer and stored in memory.

3. The flow meter of claim 2 wherein said temperature compensation performed by said at least one processor eliminates dependence on temperature of the medium when calculating the flow rate of the medium.

4. The flow meter of claim 2 wherein the at least one processor is further capable of causing said third transducer to transmit the ultrasonic pulse when said medium is not flowing through said pipe.

5. The method of claim 2 wherein the at least one processor is further capable of causing said third transducer to transmit the ultrasonic pulse contemporaneously with said time of flight measurements made between said first and second transducers.

6. The flow meter of claim 1 wherein said medium is water.

7. The flow meter of claim 1 wherein the first, second and third ultrasonic transducers are piezoelectric transceivers.

8. The flow meter of claim 1 wherein calculating the flow rate for the medium based on said time of flight measurements made between said first and second ultrasonic transducers comprises measuring a difference in propagation time of ultrasonic waves transmitted in upstream and downstream directions.

9. The flow meter of claim 1 wherein said at least one processor is further performing one or more self-calibration procedures when mounted on said pipe.

10. The flow meter of claim 9 wherein the one or more self-calibration procedures includes compensating for mismatches in time-of-flight measured for ultrasound waves propagating in upstream and downstream directions at times when the medium is present in the pipe and not flowing.

11. The flow meter of claim 9 wherein said one of said one or more self-calibration procedures includes detecting ultrasonic acoustic waves travelling along an exterior surface of said pipe and generating therefrom one or more calibration factors for calculating a distance an ultrasonic acoustic wave travels in the medium.

12. The flow meter of claim 1 further includes one or more temperature sensors mounted to the carrier assembly and configured to be coupled to the pipe when said carrier assembly is externally mounted on said pipe.

13. The flow meter of claim 1 wherein said at least one processor is further capable of detecting at least one of a presence or an absence of ultrasonic acoustic waves travelling along an exterior surface of said pipe.

14. The flow meter of claim 13 wherein said at least one processor is further capable of detecting tampering based at least in part on detecting an absence of ultrasonic acoustic waves travelling along an exterior surface of said pipe.

15. The flow meter of claim 13 wherein said at least one processor is further capable of entering a low power state in response to detecting an absence of ultrasonic acoustic waves travelling along an exterior surface of said pipe.

16. The flow meter of claim 1 further comprising at least one display device remote from said carrier assembly that is configured to display information based at least in part on the calculated flow rate for the medium.

17. The flow meter of claim 16 wherein said display device is a multi-purpose mobile computing device.

18. The flow meter of claim 1 wherein the carrier assembly is configured to be externally mounted on said pipe such that said first, second and third ultrasonic transducers are in a fixed position with respect to and can send and receive ultrasonic waves to and from an external surface of said pipe.

19. The flow meter of claim 18 further comprising a clamping mechanism configured to securely hold said carrier assembly onto said external surface of said pipe.

20. The flow meter of claim 1 further comprising a battery module capable of supplying power to the at least one processor for prolonged periods without other power sources.

21. An ultrasonic flow metering system comprising:
a flow meter comprising:
a carrier assembly configured to be externally mounted on a pipe to measure flow in a flow direction;
a first ultrasonic piezoelectric transceiver mounted to the carrier assembly at an oblique angle relative to the flow direction; and
a second ultrasonic piezoelectric transceiver mounted to the carrier assembly at an oblique angle relative to the flow direction;
a third ultrasonic piezoelectric transceiver mounted to the carrier assembly at a right angle relative to the flow direction;
a clamping mechanism configured to securely hold said carrier assembly onto said external surface of said pipe so that said carrier assembly places said first, second and third ultrasonic transceivers in a fixed position with respect to said pipe and are configured to send and receive ultrasonic waves to and from an external surface of said pipe; and
a memory configured to store sensor data and one or more applications;
at least one processor configured to communicate with the first, second, and third ultrasonic transducers and capable of:
  causing the third ultrasonic transducer to transmit an ultrasonic pulse;
  receiving from the third ultrasonic transducer a signal indicative of receipt of a first reflection of the ultrasonic pulse, where the first reflection is received after the ultrasonic pulse has: i) propagated through a near-side wall of the pipe, ii) propagated through a medium within the pipe, iii) reflected off an interface between the medium and a far-side wall, iv) propagated back through the medium within the pipe; and v) propagated back through the near-side wall of the pipe;
  receiving from the third ultrasonic transducer a signal indicative of receipt of a further reflection of the ultrasonic pulse, where the further reflection is received after the ultrasonic pulse is reflected off the interface between the medium and the far-side wall at least a second time;
  determining a pipe cross-sectional area based upon a time difference between receipt of the first reflection and receipt of the further reflection by the third ultrasonic transducer;
  calculating a flow rate for the medium based on time of flight measurements made between said first and second ultrasonic transceivers and the determined pipe cross-sectional area by determining therefrom a difference in propagation time of ultrasonic waves when transmitted in upstream and downstream directions;
a battery module capable of supplying power to the at least one processor and the memory;
a server located in a location remote from said flow meter, said server in wireless communication with said flow meter and having a memory storage system configured to store information based on flow rates measured by said flow meter; and
a display device on a multi-purpose mobile computing device at a location remote from said flow meter, the multi-purpose mobile computing device being configured to display information based on the calculated flow rate for the medium.

22. A method for measuring a flow rate of a medium, the method comprising:
  measuring, using at least one processor, time of flight of ultrasonic pulses propagating between first and second ultrasonic transducers mounted externally on a pipe using at least one processor, where each of the ultrasonic pulses: i) propagates through a near-side wall of the pipe a first time, ii) propagates through a medium within the pipe a first time at an oblique angle with respect to a direction of flow of the medium though the pipe, iii) reflects off an interface between the medium and a far-side wall, iv) propagates back through the medium a second time, and v) propagates through the near-side wall of the pipe a second time;
  transmitting an ultrasonic pulse using a third ultrasonic transducer mounted externally on the pipe;
  receiving from the third ultrasonic transducer a signal indicative of receipt of a first reflection of the ultrasonic pulse, where the first reflection is received after the ultrasonic pulse has: i) propagated through a near-side wall of the pipe, ii) propagated through a medium within the pipe at substantially at a right angle with respect to a direction of flow of the medium though the pipe, iii) reflected off an interface between the medium and a far-side wall, iv) propagated back through the medium within the pipe; and v) propagated back through the near-side wall of the pipe;
  receiving from the third ultrasonic transducer a signal indicative of receipt of a further reflection of the ultrasonic pulse, where the further reflection is received after the ultrasonic pulse is reflected off the interface between the medium and the far-side wall at least a second time;
  determining, by the at least one processor, a pipe cross-sectional area based upon a time difference between receipt of the first reflection and receipt of the further reflection by the third ultrasonic transducer;
  calculating, by the at least one processor, a flow rate for the medium based on said time of flight measurements made between the first and second ultrasonic transducers and the determined pipe cross-sectional area.

23. A method according to claim 22 wherein calculating the flow rate of the medium based on the time of flight measurements further comprises performing temperature compensation based at least in part on one or more time of flight measurements made using said third transducer.

24. A method according to claim 23 wherein said temperature compensation is based at least in part on a determination of an inner diameter of the pipe based on measurements made using said third transducer.

25. The method of claim 23 wherein transmitting the ultrasonic pulse using said third transducer occurs: i) before said measuring time of flight of ultrasonic pulses propagating between said first and second transducers, and ii) when said medium is present and not flowing through said pipe.

26. The method of claim 23 wherein transmitting the ultrasonic pulse using said third transducer occurs contemporaneously with said measuring time of flight between first and second transducers.

27. The method of claim 22 wherein said medium is water.

28. The method of claim 22 further comprising performing one or more self-calibration procedures, using the at least one processor, to compensate for mismatches in time-of-flight measurements of ultrasonic pulses propagating between said first and second ultrasonic transducers propagating in upstream and downstream directions at times when the medium in the pipe is not flowing.

29. The method of claim 22 further comprising detecting, using the at least one processor, at least one of a presence or an absence of ultrasonic acoustic waves travelling along an exterior surface of said pipe wall.

30. The method of claim 22 further comprising displaying information based at least in part on said calculated flow rates on a display device located remotely from said pipe.

31. The method of claim 30 wherein said display device is a multi-purpose mobile computing device.

32. The method of claim 22 further comprising mounting a carrier assembly on which said first, second and third ultrasonic transducers are carried to the pipe by clamping said carrier assembly to an exterior surface of said pipe wall such that said first, second and third ultrasonic transducers are in a fixed position with respect to and can send and receive ultrasonic waves to and from an external surface of said pipe.

* * * * *